United States Patent
Constantinescu

(10) Patent No.: US 6,775,893 B2
(45) Date of Patent: Aug. 17, 2004

(54) JIGS FOR ASSEMBLY OF FLEXIBLE SUPPORT STRUCTURES

(75) Inventor: Eugene Constantinescu, Greensboro, NC (US)

(73) Assignee: Sealy Technology LLC, Trinity, NC (US)

( * ) Notice: Subject to any disclaimer, the term of this patent is extended or adjusted under 35 U.S.C. 154(b) by 0 days.

(21) Appl. No.: 10/080,851

(22) Filed: Feb. 22, 2002

(65) Prior Publication Data

US 2002/0113346 A1 Aug. 22, 2002

Related U.S. Application Data

(60) Division of application No. 09/614,429, filed on Jul. 12, 2000, now Pat. No. 6,406,009, which is a continuation-in-part of application No. 09/260,823, filed on Mar. 2, 1999, now Pat. No. 6,354,527, which is a continuation of application No. 08/843,927, filed on Apr. 17, 1997, now abandoned, which is a continuation-in-part of application No. 08/487,022, filed on Jun. 7, 1995, now Pat. No. 5,720,471.

(51) Int. Cl.$^7$ .............................................. B23P 19/00
(52) U.S. Cl. ................................................... 29/281.5
(58) Field of Search .......................... 269/910, 41, 305, 269/304, 299, 903, 37, 45, 285; 29/281.1, 281.3, 281.4, 281.5

(56) References Cited

U.S. PATENT DOCUMENTS 3,241,585 A * 3/1966 Jureit ........................... 269/45
4,154,436 A * 5/1979 Sellers ......................... 269/14
4,206,910 A * 6/1980 Biesemeyer ................ 269/285
4,522,380 A 6/1985 Peddle
4,751,995 A 6/1988 Naruse et al.
4,944,339 A 7/1990 Luyten
4,948,108 A * 8/1990 Sullivan ....................... 269/43
5,142,764 A 9/1992 Whiteside
5,205,198 A 4/1993 Foray et al.
5,401,010 A * 3/1995 Haswell et al. ............... 269/45
6,170,163 B1 1/2001 Bordignon et al.

* cited by examiner

Primary Examiner—Robert C. Watson
(74) Attorney, Agent, or Firm—Roetzel & Andress

(57) ABSTRACT

Devices and methods for assembly of flexible weight bearing structures such as mattress foundations using the composite material spring modules are described. The invention provides assembly jigs for dimensionally fixed attachment of spring modules to frame members, and alignment of frame members with attached spring modules for attachment to an overlying grid. The jigs comprise blocks which are suitably slidably mounted on a jig channel, which is suitably an extrusion. The blocks are fixed at a predetermined position on a jig channel and are configured to receive a portion of a frame member. Each block further has a structure for securing a spring module at a predetermined position relative to a received frame member.

3 Claims, 26 Drawing Sheets

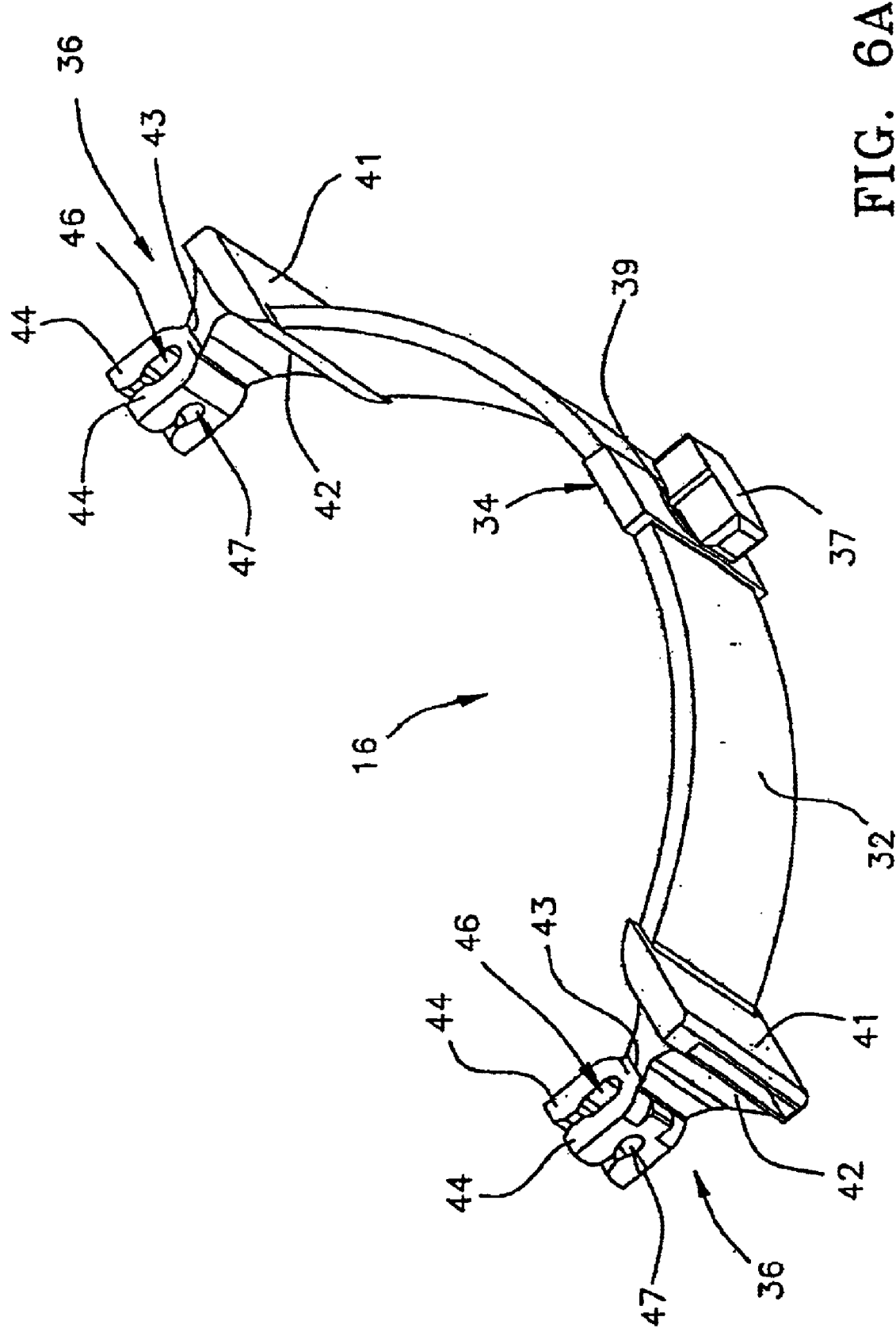

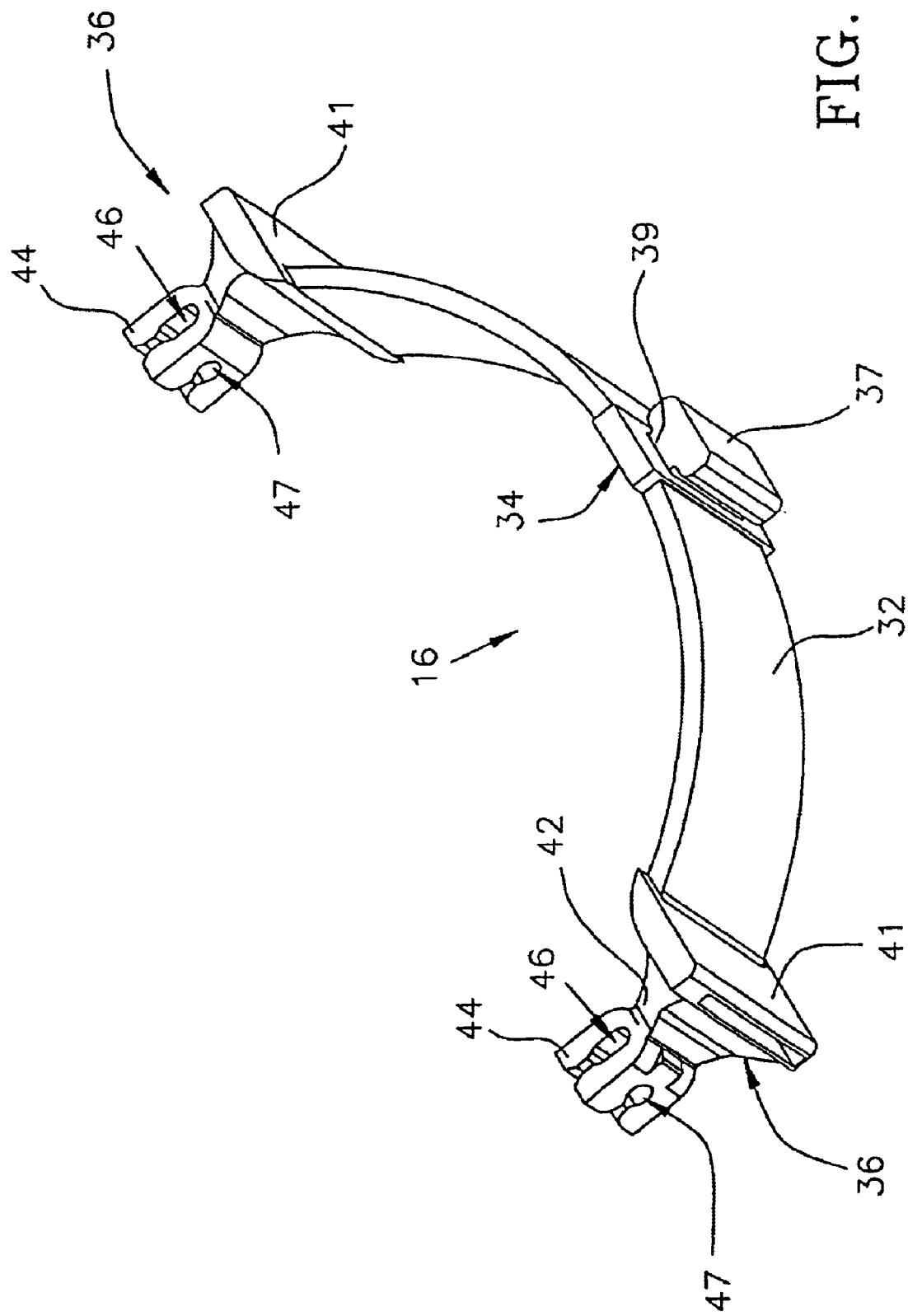

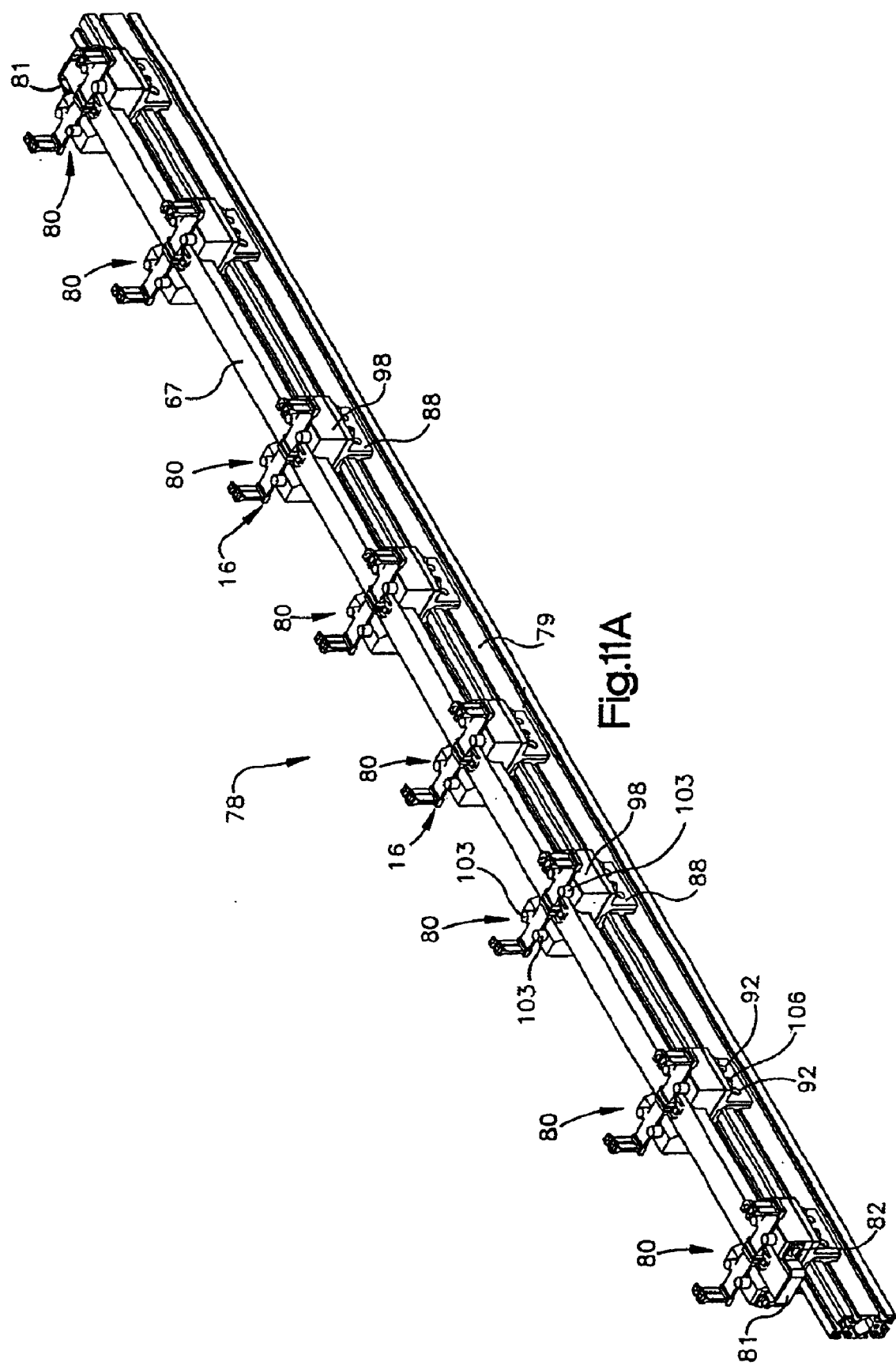

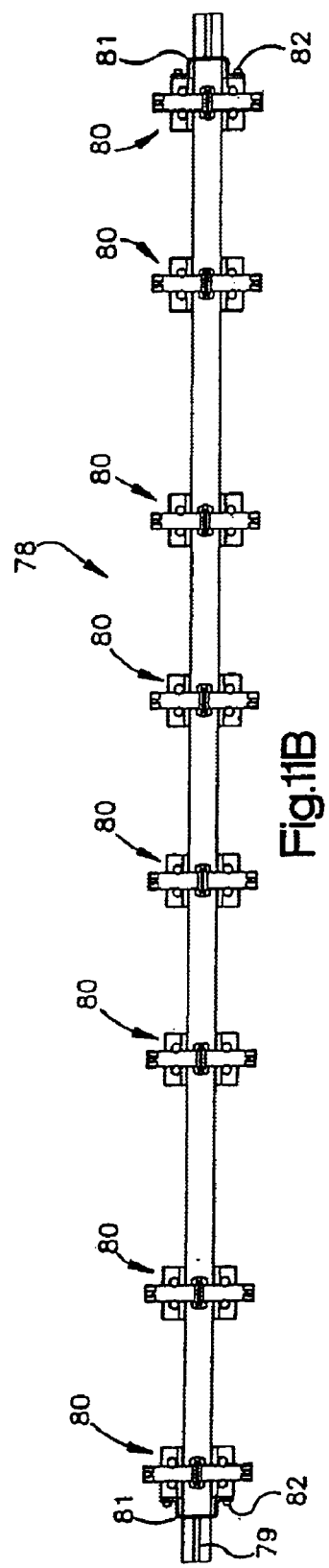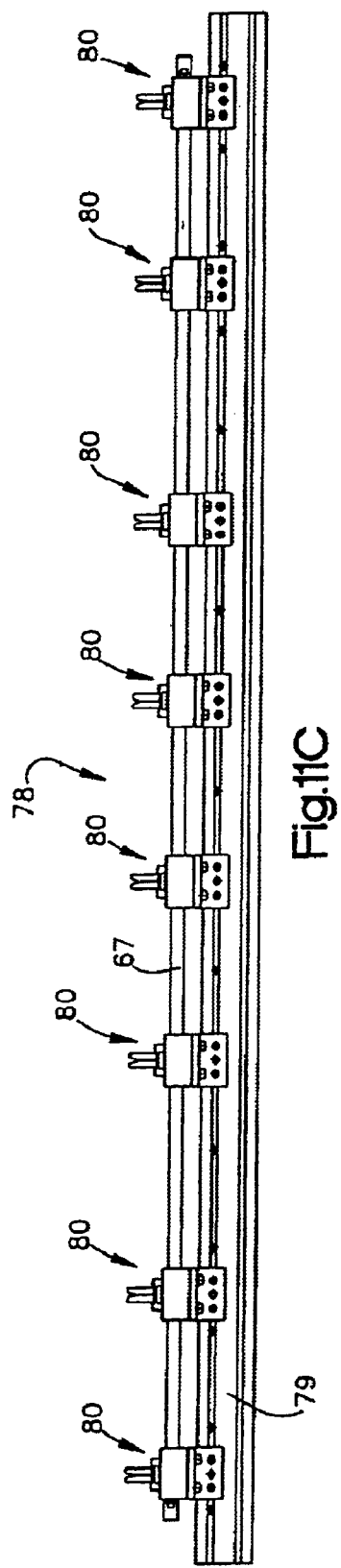

JIGS FOR ASSEMBLY OF FLEXIBLE SUPPORT STRUCTURES

RELATED APPLICATIONS

This application is a divisional application of U.S. application Ser. No. 09/614,429, now U.S. Pat. No. 6,406,009 filed Jul. 12, 2000, which is a continuation-in-part of U.S. application Ser. No. 09/260,823, now U.S. Pat. No. 6,354,527 filed Mar. 2, 1999, which is a continuation of U.S. application Ser. No. 08/843,927, now abandoned filed Apr. 17, 1997, which is a continuation-in-part of U.S. application Ser. No. 08/487,022, filed Jun. 7, 1995, now U.S. Pat. No. 5,720,471.

FIELD OF THE INVENTION

The present invention pertains generally to flexible support structures having a frame structure with springs attached to frame members and to an overlying grid, and more particularly to devices and methods for the assembly of support structures with composite material or plastic springs attached directly to frame members.

BACKGROUND OF THE INVENTION

Springs for use as flexible support elements in support structures such as seating and bedding and furniture have traditionally and conventionally been constructed of spring steel and wire. See, for example, U.S. Pat. Nos. 188,636; 488,378; 1,887,058; 4,535,978; 4,339,834; 5,558,315. Attempts have been made to construct spring support elements out of plastic material. See, for example U.S. Pat. Nos. 4,530,490; 4,736,932; 5,165,125 and 5,265,291. Although fiber reinforced plastic springs are fairly well-developed, the use thereof in flexible support structures such as seating, furniture and bedding presents the formidable engineering challenge of providing suitable means for attachment of the springs to a frame structure and an overlying support surface. Plastic springs have heretofore been simply mechanically attached to a supporting structure such as described in U.S. Pat. No. 4,411,159 on a fiber reinforced plastic leaf spring for a vehicle. Any type of mechanical attachment is complicated by the extreme hardness and stiffness of fiber reinforced plastics. Ultimately it is nearly always necessary to drill attachment holes in the spring for a mechanical fastener (such as described in U.S. Pat. No. 4,736,932) requiring additional manufacturing and assembly steps. Also, drilling through the fiber-reinforced structure breaks the preferred long strand/roving fibers which are critical to providing optimal spring characteristics. A related application discloses clips for attachment of mattress foundation springs to a frame and an overlying grid. Although fully operative and novel, this approach requires additional parts and increased assembly tasks, and does not entirely overcome the negatives of possible slippage between the spring and the clips, and noise generation by such relative motion.

Conventional bedding systems commonly include a mattress supported by a foundation or "box spring". Foundations are provided to give support and firmness to the mattress as well as resilience in order to deflect under excessive or shock load. Foundations are typically composed of a rectangular wooden frame, a steel wire grid supported above the wooden frame by an array of steel wire springs such as compression type springs which are secured to the wooden frame. In order to properly support and maintain the firmness level in the mattress, a large number of compression springs are needed in the foundation, resulting in high production cost. This is the main disadvantage of using compression springs in mattress foundations. Also, foundations which use compression springs typically have a low carbon wire grid or matrix attached to the tops of the springs. Both the wires and the welds of the matrix can be bent or broken under abusive conditions. In such steel/metal systems, fasteners are required to secure the springs to the grid and to the frame. This leads to metal-to-metal contact which can easily produce squeaking sounds under dynamic loading.

In an effort to avoid the high cost of using compression springs in foundations, another type of spring used is the torsional steel spring formed from heavy gauge steel spring wire bent into multiple continuous sections which deflect by torsion when compressed. See for example U.S. Pat. Nos. 4,932,535; 5,346,190 and 5,558,315. Because torsional springs are dimensionally larger and stiffer than compression springs, fewer torsional springs are needed in the foundation. However, the manufacture of torsional-type springs from steel wire requires very expensive tooling and bending equipment. Elaborate progressive bending dies are required to produce the complex torsional spring module shapes which may include four or more adjoining sections. The manufacturing process is not economically adaptable to produce different spring configurations without new tooling, tooling reworking and/or machinery set-up changes and process disruption, etc. Therefore, the configuration and resultant spring rate of such springs cannot be easily or inexpensively altered to produce foundations with different support characteristics. Furthermore, the many bends in these types of springs make dimensional quality control and spring rate tolerance control very difficult to achieve. Also, variations in steel material properties and the need for corrosion protection and heat-treating add to the cost and difficulty of producing steel wire spring modules. And furthermore, the awkward geometry of the relatively large torsional springs makes assembly of the springs in the foundation frame relatively difficult.

Another disadvantage of the use of steel wire springs in foundations, and a particular disadvantage of torsional springs, is the phenomenon of "spring set" in which a spring does not return completely to an uncompressed height following excessive loading. So long as a spring is deflected within its spring rate tolerance range, it can be repeatedly loaded for a certain number of cycles without noticeable change in operating characteristics. However, if deflected past the maximum deflection range, it will undergo permanent deformation or "set", resulting in a permanent change in operating characteristics such as lack of reflexive support, permanent change in shape, or catastrophic failure in the form of breakage. Spring set in steel wire springs may also occur simply following prolonged normal use, i.e., continuous heavy loading. This phenomenon is also generally referred to as fatigue and can result in catastrophic failure.

Mattresses of increased thickness dimension such as "pillow-top" mattresses, when placed on top of traditional foundations of six to eight inch height, can be too high in proportion to the head and foot boards of beds, resulting in an awkward appearance and an excessively high sleeping surface. This trend toward larger mattress and foundations increases distribution and storage costs. Mattress foundations in the United States typically measure on the order of five to eight inches thick, with an average thickness (or height) of six and one half to seven and one half inches. In conventional foundations, most all of this dimension is attributable to the height of the wire spring modules. In general, deflection of torsional wire spring modules is limited to approximately 20% of the total height dimension. Compression which exceeds the 20% range can cause spring set or breakage. Reducing the overall height of torsional spring modules can make the springs too rigid and diminishes the desired deflection characteristics and ability to absorb heavy loads with recovery. Moreover, the number of cycles to failure during life testing is generally harder to predict with shortened height spring wire modules and is usually many less cycles to failure than spring wire modules of greater height. Nonetheless, it would be desirable to have a foundation with reduced height while retaining the desired support and deflection characteristics.

In the prior art, wire-type springs have been attached directly to frame members, as for example in U.S. Pat. No. 4,867,424. In the related applications, the composite material springs are configured with an "attachment fitting" which engages in a metal rail such as the patented Sealy Steel Span™ mattress foundation frame rail. There has not been provided, however, a composite material spring which is adapted for direct attachment to a generic frame member not specially adapted to engage spring modules.

Another challenge of producing this type of product is the arrangement and attachment of multiple spring components upon a frame. This is most commonly accomplished through manual labor involving construction of the frame with multiple frame members, and correct placement and attachment of each of the spring components to the frame members. These steps may further be combined with interconnection of each of the spring components with the overlying grid. This presents a substantial alignment and registration issue, for each spring component must correspond to the correct location for attachment to the grid, which is typically at or near intersections of the wire pieces of the grid. Misalignment or misplacement of even a single spring component may defeat attachment of the grid, and require tedious re-assembly at the factory.

SUMMARY OF THE INVENTION

The present invention overcomes these and other disadvantages of the prior art, by providing in one aspect assembly jigs for dimensionally fixed attachment of spring modules to frame members, and for alignment of frame members with attached spring modules for attachment to an overlying grid. The jigs comprise blocks which are slidably mounted on a jig channel, which is in one embodiment in the form of an extrusion. The blocks are fixed at a predetermined position on a jig channel and are configured to receive a portion of a frame member. Each block farther has a structure for securing a spring module at a predetermined position relative to a received frame member.

In a preferred embodiment, the invention provides an assembly jig for attaching springs to a frame member for a flexible support structure. The assembly jig system has a plurality of blocks slidably mounted upon a jig channel. Each block comprises a guide block configured to overlay the jig channel, generally opposing walls configured to receive a portion of a frame member, and spring positioning pins configured to position a spring module into alignment with a frame member received by the generally opposing walls.

The invention further includes a novel method for manufacturing foundations using rectilinear frame members made of wood or other suitable natural or synthetic material, and composite material springs. The method allows for inexpensive and efficient production of mattress frames well-suited to both manual or automated manufacture. The method involves the assembly of a flexible support structure having a plurality of frame members, a plurality of springs attached to each frame member, and each spring attached to a grid which overlies the springs and the frame members. A plurality of jigs are positioned based on the size of the support structure. Each of the jigs has a plurality of blocks mounted upon a jig channel, and each block is configured to receive at least a portion of a frame member. Each block also has a structure for positioning a spring module into alignment with a received frame member. The plurality of blocks are located on a jig channel corresponding to the grid. Frame members are placed on the jig channel such that a plurality of blocks on the jig channel receive a portion of the frame member. A plurality of spring modules are placed on a plurality of blocks on the jig channel such that the spring modules are aligned with a received frame member. Upon achieving alignment, the spring modules are positioned upon and fastened to the frame member on the jig channel, either manually or in an automated process such as by robotics. The spring modules are then suitably connected to the grid, either through integral attachment fittings or by a separate fastening device.

These and other aspects of the invention are herein described in particularized detail with reference to the accompanying Figures, illustrative of exemplary manners in which the invention can be embodied.

BRIEF DESCRIPTION OF THE FIGURES

In the accompanying Drawings:

FIG. 6A is a perspective view of an alternate embodiment of a composite material spring module with integrally formed attachment fittings of the present invention;

FIG. 6B is a perspective view of another embodiment of a spring module of the invention;

FIG. 11A is a perspective view of a jig used to place and secure composite spring modules to a frame member of a spring structure;

FIG. 11B is an overhead view of a jig used to place and secure composite spring modules to a frame member of a spring structure;

FIG. 11C is a side view of a jig used to place and secure composite spring modules to a frame member of a spring structure;

DETAILED DESCRIPTION OF PREFERRED AND ALTERNATE EMBODIMENTS OF THE INVENTION

Figure 1A:
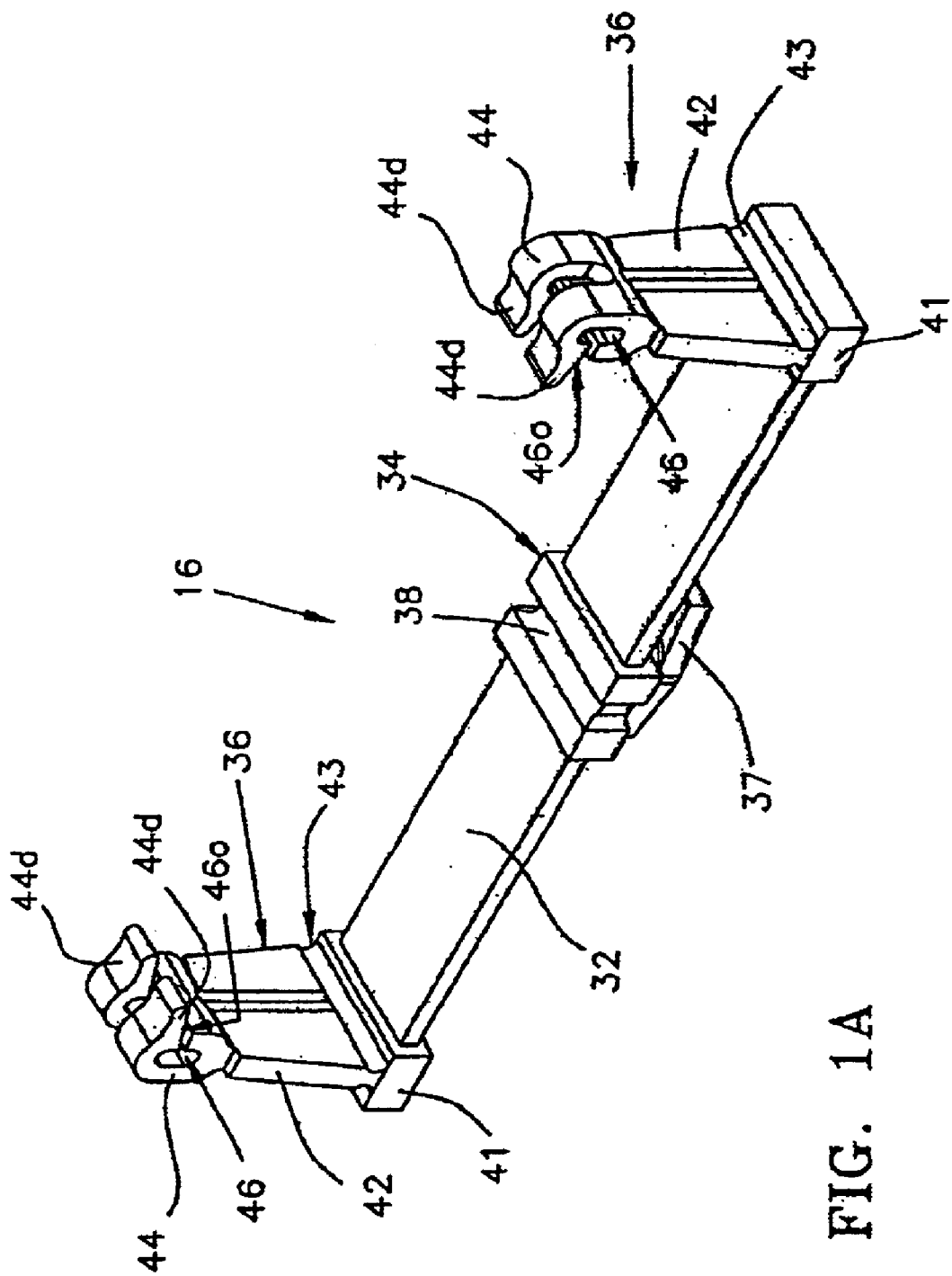
FIGS. 1A–1C are perspective views of composite material spring modules with integrally formed attachment fittings of the present invention.
Figure 1B:
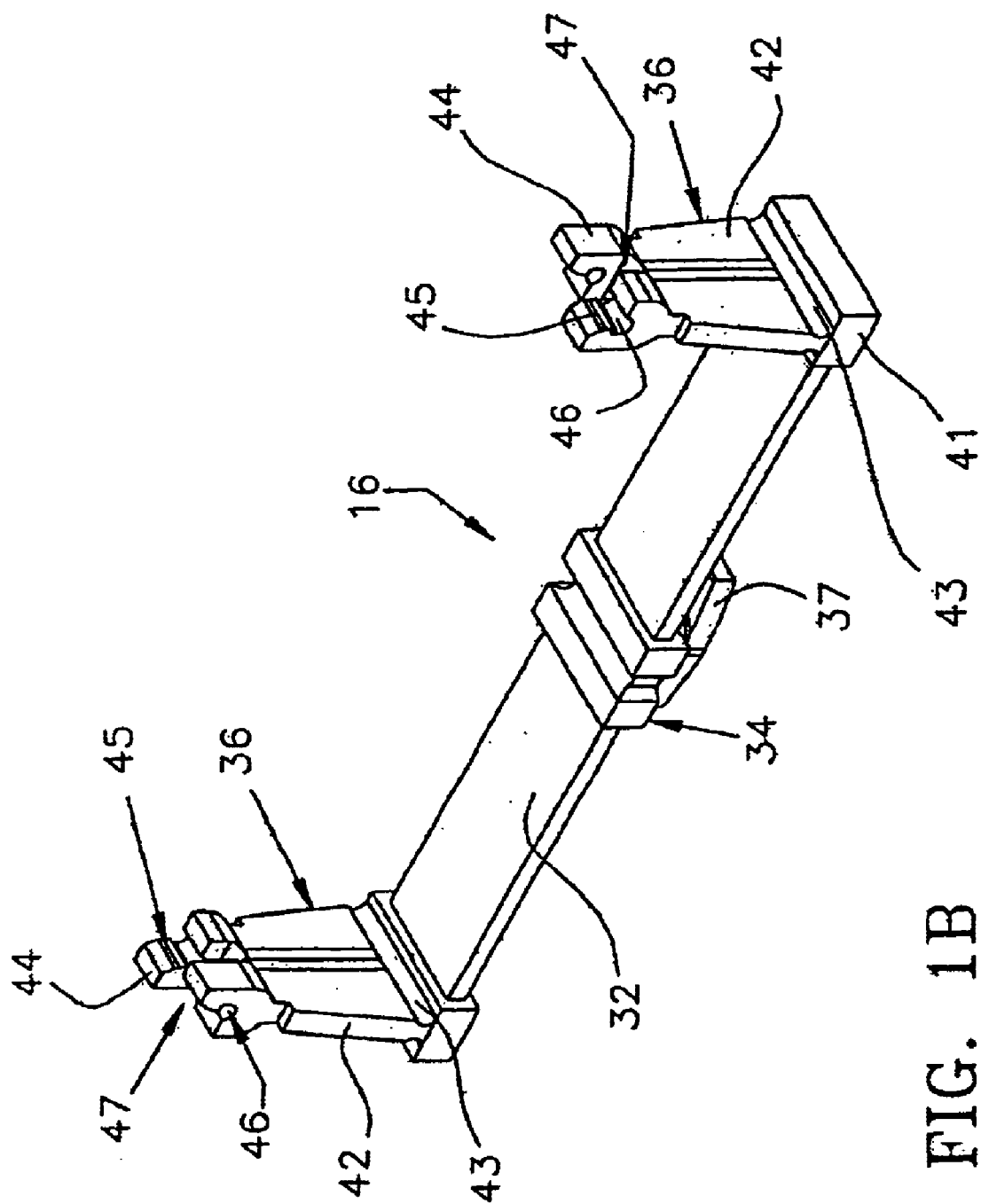
Figure 1C:
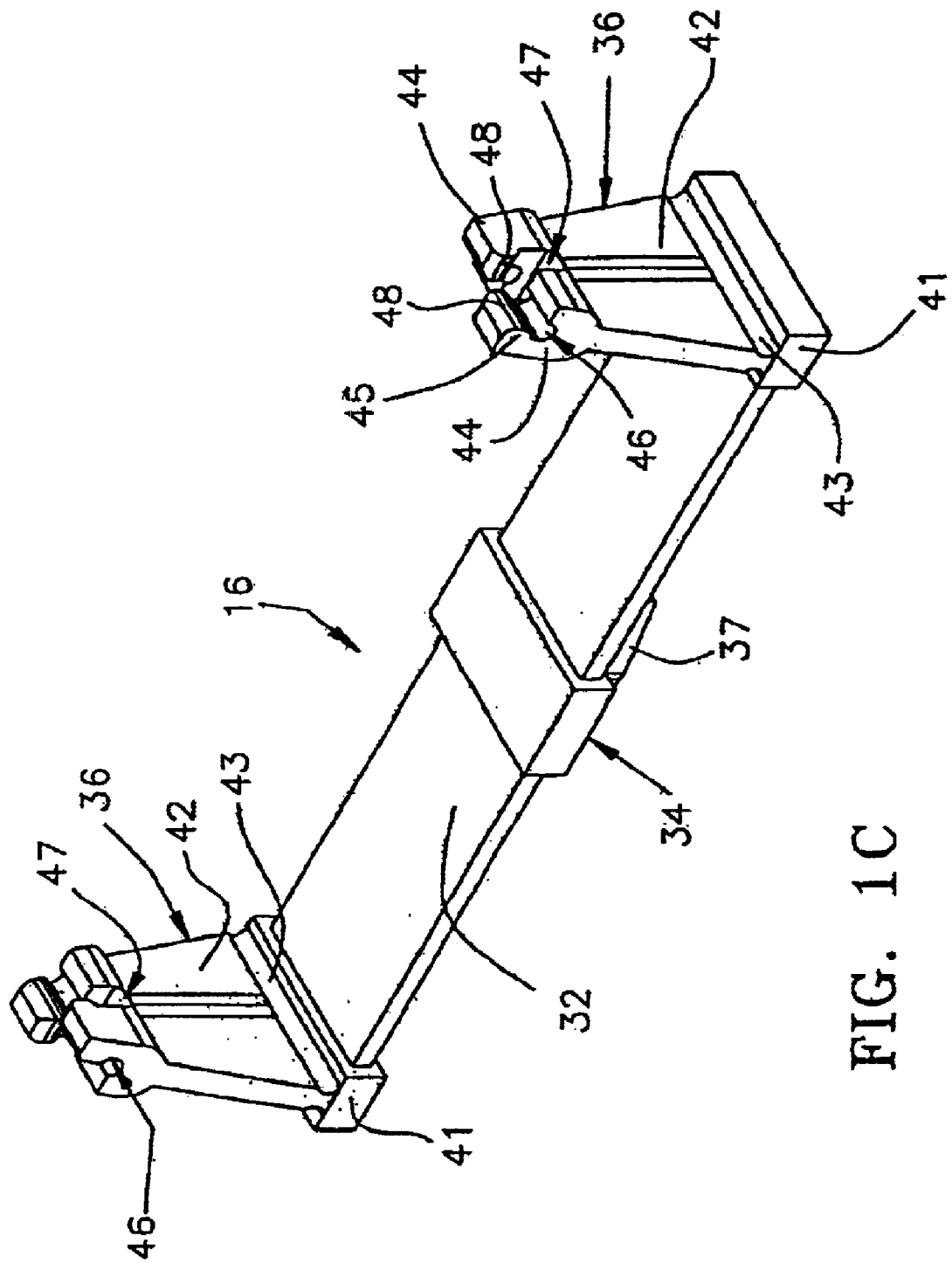

FIGS. 1A–1C illustrate preferred embodiments of a composite material spring module 16 of the invention having a generally planar elongate composite material fiber-reinforced plastic spring body 32, an integrally formed centrally disposed frame attachment fitting 34, and integrally formed grid attachment stanchion fittings 36 at opposite distal ends of body 32. Frame attachment fitting 34 and stanchion fittings 36 (herein collectively referred to as "attachment fittings") may be made of any structurally suitable material, such as plastic or metal, and molded around, bonded, fastened or secured to body 32 at the respective positions. In the preferred embodiment, attachment fittings 34 and 36 are integrally formed about the spring body 32 by an insert molding process. For example, a spring body 32 (of the simple planar, rectangular configuration shown or any of the other configurations described herein and in the related application) is placed in a mold having a cavity for receiving body 32 and connected cavities in the forms of fittings 34 and 36. The mold is then injected with any suitable moldable material such as polypropylene, polyethylene, Santoprene™, nylon or ABS partially or completely encapsulating the spring body 32. Alternatively, the entire module 16 (including the body 32 and fittings 34, 36) may be molded as a single piece such as from fiber reinforced plastic material. Also, the fittings could be separately molded or pultruded and then bonded (glued) to the spring module body.

The spring module body 32 may be produced from a wide variety of composite materials such as fiber reinforced plastic, fibers in combination with epoxy or vinyl or polyesters, high density plastic such as polyethylene, high density plastic foam, encapsulated steel and steel alloys, or any other material which exhibits the desired spring rates and cycle duration. When made of a fiber-reinforced composite material, the modules may be compound molded and/or compression molded into the configuration of a male/female mold cavity under heat and pressure, or pultruded. For example, continuous fiberglass strands, approximately 60% to 80% of the product volume, are saturated with a resin system by winding or pultrusion through a bath of epoxy or vinyl ester which is approximately 20% to 40% of the product volume. The material is then loaded into a compression mold, molded and cured. Flash is removed by conventional methods such as a vibrating pumice bed. The molding material can be selected and blended to produce modules of different spring rates.

The spring bodies of generally linear configuration such as that of FIG. 1, are preferably formed by a pultrusion process wherein the reinforcing fibers are drawn through a bath of the plastic material in a liquid state and through a die which defines the cross-sectional configuration of the body, and the spring body is cut to the desired length. Pigments can be used in the molding material to readily identify modules of different spring rates, which greatly aids the assembly process described below. As used herein, the term "composite" refers to the combination of the plastic material of the spring body and the fibers in the spring body. The term "composite" also herein refers to the combination of the third material which is molded about the spring body to form the attachment fittings, as described below in detail.

Certain configurations of the composite material spring modules, as further disclosed below, may be formed by pultrusion and continuous pultrusion of, for example, fiber-reinforced plastic wherein fiber strands (including but not limited to glass fibers, Kevlar®, Mylar®, graphite, carbon or steel strands) are pulled from a reel through a resin impregnating bath, and continuously pulled through a forming and curing die. The continuous strand of composite material is then cut transversely (i.e., along the cross-section of the part) to any desired length to provide the finished spring body. Pultrusion is especially well suited for very high volume mass production of spring bodies having substantially linear configurations. Curvilinear spring module configurations may be pultruded and/or pultruded and compression molded as described. Another significant advantage of formation of spring modules by these processes is the ability to easily alter the spring characteristics of modules simply by altering the number of fibers, and/or the location or orientation of the fibers within the modules. In the preferred embodiment, the fibers are aligned with a length dimension of the module, and extend substantially the entire length of the module body. In alternate embodiments, the fibers are oriented to intersect at fixed or random angles.

The attachment of the composite material spring modules 16 with integrally formed attachment fittings will now be described in the context of mattress foundations having an underlying frame structure which supports the spring modules, and an overlying grid reflexively supported by the spring modules. However, it will be appreciated that it is well within the scope of the invention to attach the spring modules to any type of supporting structure or framework, and to optionally attach any type of structure or assembly to the spring modules whereby the spring modules provide a reflexive surface or object. Some specific examples of structures and assemblies to which the spring modules may be attached include all types of furniture, seating including vehicle and aircraft seating, energy absorbing walls, floors or other surfaces such as vibration dampening supports, and suspension systems.

Figure 2:
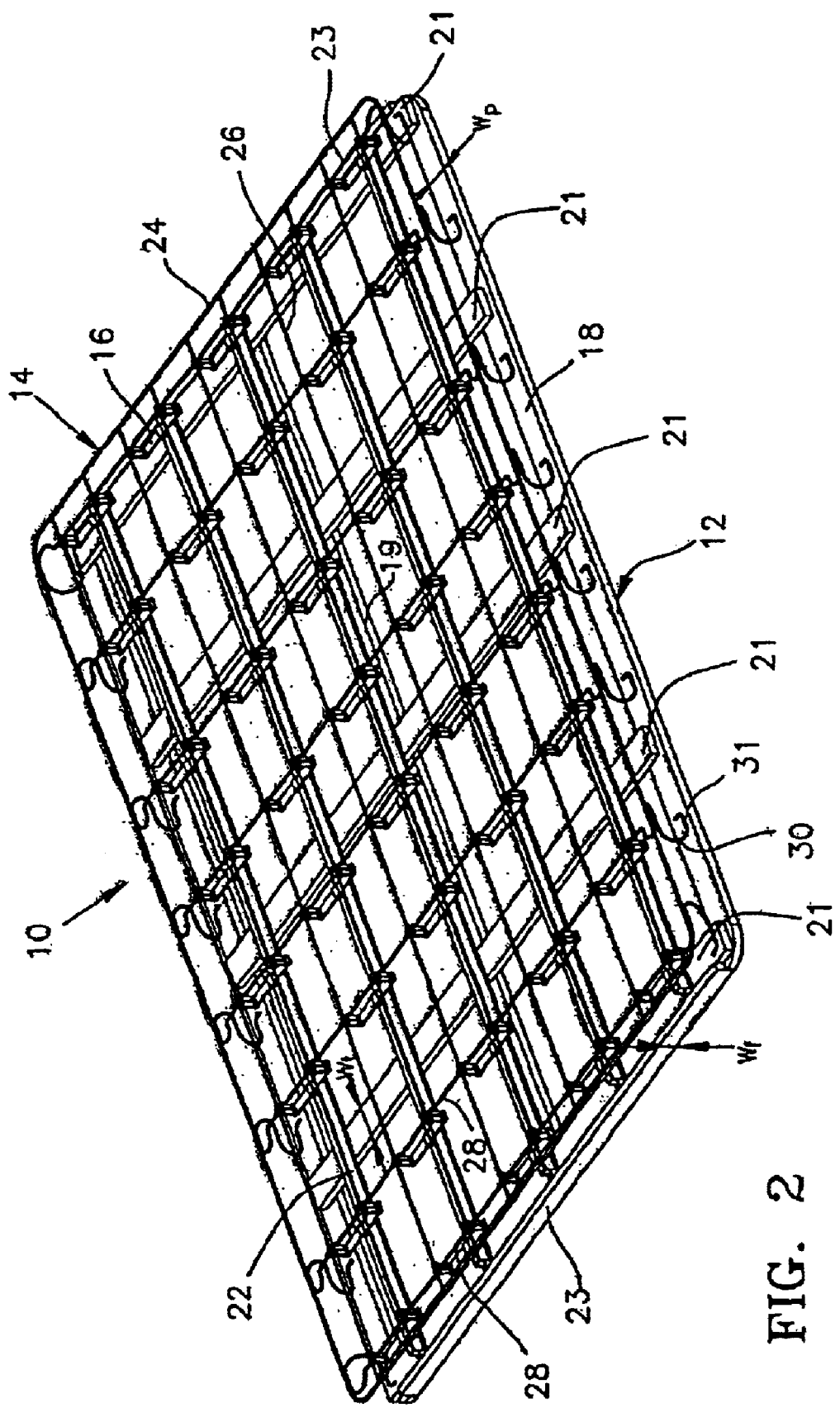
FIG. 2 is a perspective view of a mattress foundation having composite material spring modules with integrally formed attachment fittings of the present invention.

FIG. 2 illustrates one embodiment of a low profile mattress foundation of the invention having a plurality of composite material spring modules 16 constructed in accordance with the invention. The foundation 10 includes a novel low profile frame, indicated generally at 12 which supports a plurality of composite material spring modules 16 attached to a grid or matrix 14 disposed parallel to and above frame 12 as a mattress supporting surface. In this embodiment, frame 12 includes two longitudinally extending perimeter members 18, a central longitudinal member 19, and a plurality of intermediate transverse members 21, all of which may be constructed of wood or steel or metal such as aluminum or other suitable materials such as pultruded or extruded beam-like parts or blow-molded or structural foam parts, and secured together to form a rectilinear frame.

In the low profile frame the transverse members 21 are laid flat with a major width $w_t$ parallel to and flush against the major widths $w_p$ of longitudinal members 18 and 19, and the narrow edges e orthogonal to the top surfaces of members 18 and 19. A plurality of longitudinally extending upper longitudinal frame members 22 (which may be constructed of wood or steel, or extruded or pultruded plastic such as polyethylene or polypropylene, PVC or fiberglass reinforced plastic) are attached orthogonal to the major widths $w_t$ (top surfaces) of transverse members 21. An end fascia board or strip 23 is attached to each transverse end of the frame, against the outer narrow edge of the transverse perimeter members 21 at the ends of the longitudinal perimeter members 18. A major width $w_f$ of fascia board 23 is thereby perpendicular to the major width $w_t$ of end transverse members 21 and a bottom narrow edge of the fascia board is flush with bottom surfaces of the longitudinal members. The bottom edge of the fascia strip 23 is flush with the bottom surfaces of the perimeter frame members to create a smooth continuous surface for attachment of upholstery. The fascia board 23 may extend vertically above the end transverse members 21 to provide a chock against which the ends of upper longitudinal frame members 22 abut. With the upper longitudinal frame members 22 cut to equal length, abutment of the ends against the fascia strips 23 insures that the frame will be checked and square when assembled. The spring modules 16 are attached to top surfaces of the upper longitudinal frame members 22 as further described below.

The grid 14 is formed by a peripheral border element 24 also called a "borderwire", of generally the same width and length dimensions of frame 12, a plurality of longitudinal elements 26 secured to the border element by clips or welds or simply bent or hooked around the borderwire 24, and a plurality of transverse grid elements 28 (also referred to herein as "crosswires") which intersect longitudinal elements 26 to define a generally orthogonal grid 14 which forms a support surface for a mattress. The grid 14 (including elements 24, 26 and 28) may alternatively be constructed of low carbon or high carbon steel, but may alternatively be formed of composite material such as fiber reinforced plastic which is then glued or ultrasonically welded or otherwise fastened in an orthogonal matrix or other arrangement, or formed as a single integrated structure by plastic or composite material molding processes suitable for relatively large structures such as rotational molding or injection molding of structural foam.

The terminal ends of transverse elements or crosswires 28 are downwardly bent to form vertical support elements 30 with mounting feet 31 secured to frame 12 to support the peripheral borderwire 24 and clipped to the grid 14 over frame 12. Support elements 30 may be selectively formed to any desired height above frame 12 to extend from the borderwire 24 to members 18 and configured to deflect in the manner of a spring as is known in the art.

As further shown in FIG. 2, the grid 14 is supported over frame 12 by the plurality of spring modules 16 attached at a bottom point to upper longitudinal frame members 22 and at upper points about the intersection of elements 26 and 28 of grid 14. As further shown in FIGS. 1A–1C and FIGS. 3A and 3B, each of the grid attachment stanchion fittings 36 include a base 41 secured to or formed about a distal end of module body 32, an upright member 42 (also referred to as a "stanchion") attached at one end through a flexible hinge 43 to base 41, and a pair of gripping fingers 44 at an opposite end of the upright stanchion member 42 configured to attach about a longitudinal grid member 26 and to straddle the transverse grid member 28 at the intersections with longitudinal grid member 26, as shown close up in FIGS. 3A and 3B. In this embodiment, the longitudinal grid member 26 overlaps transverse grid member 28 to lock it into channel 47.

Figure 3A:
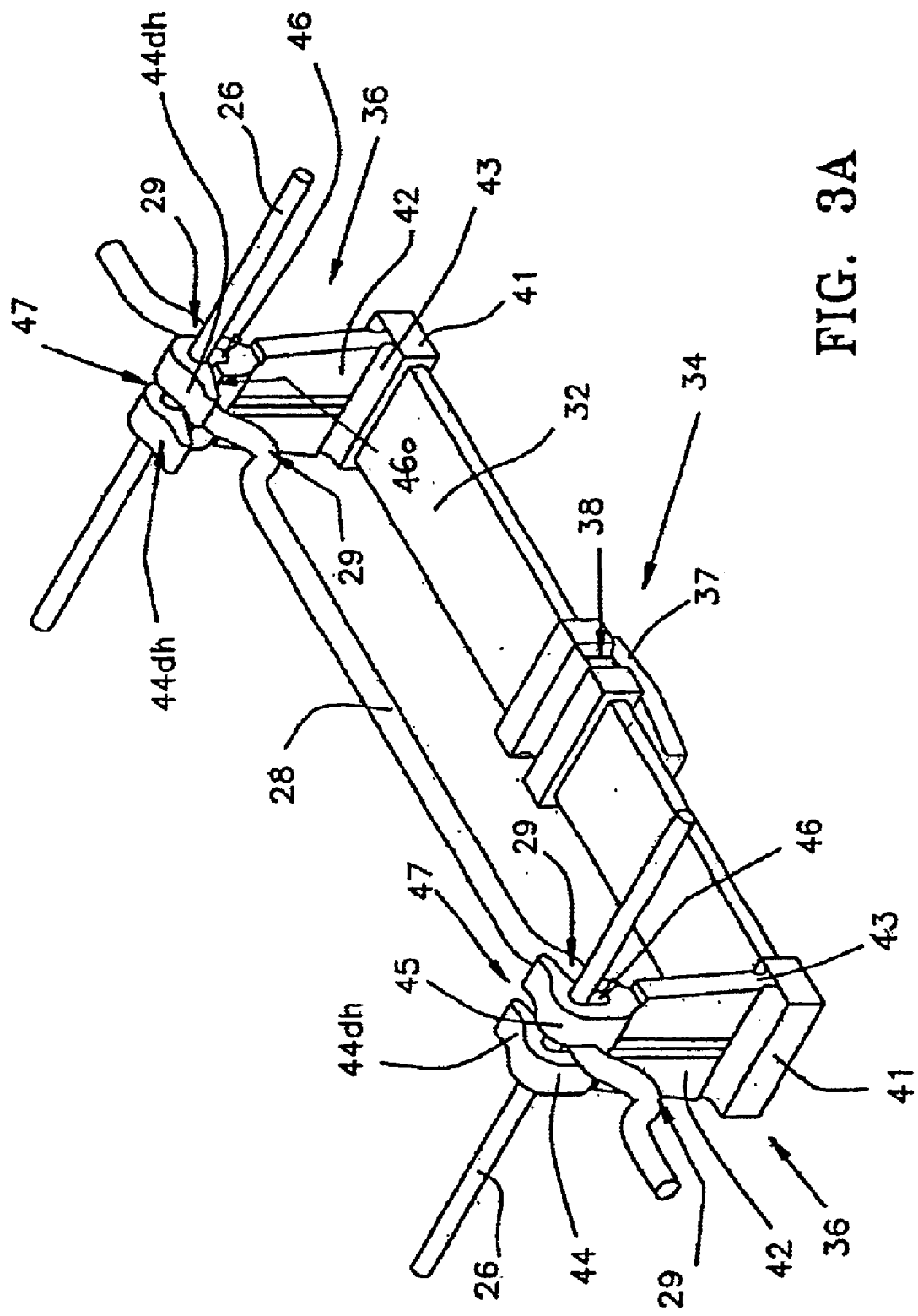
FIGS. 3A and 3B are perspective views of composite material spring modules of the invention engaged with intersecting members of a mattress foundation grid.
Figure 3B:
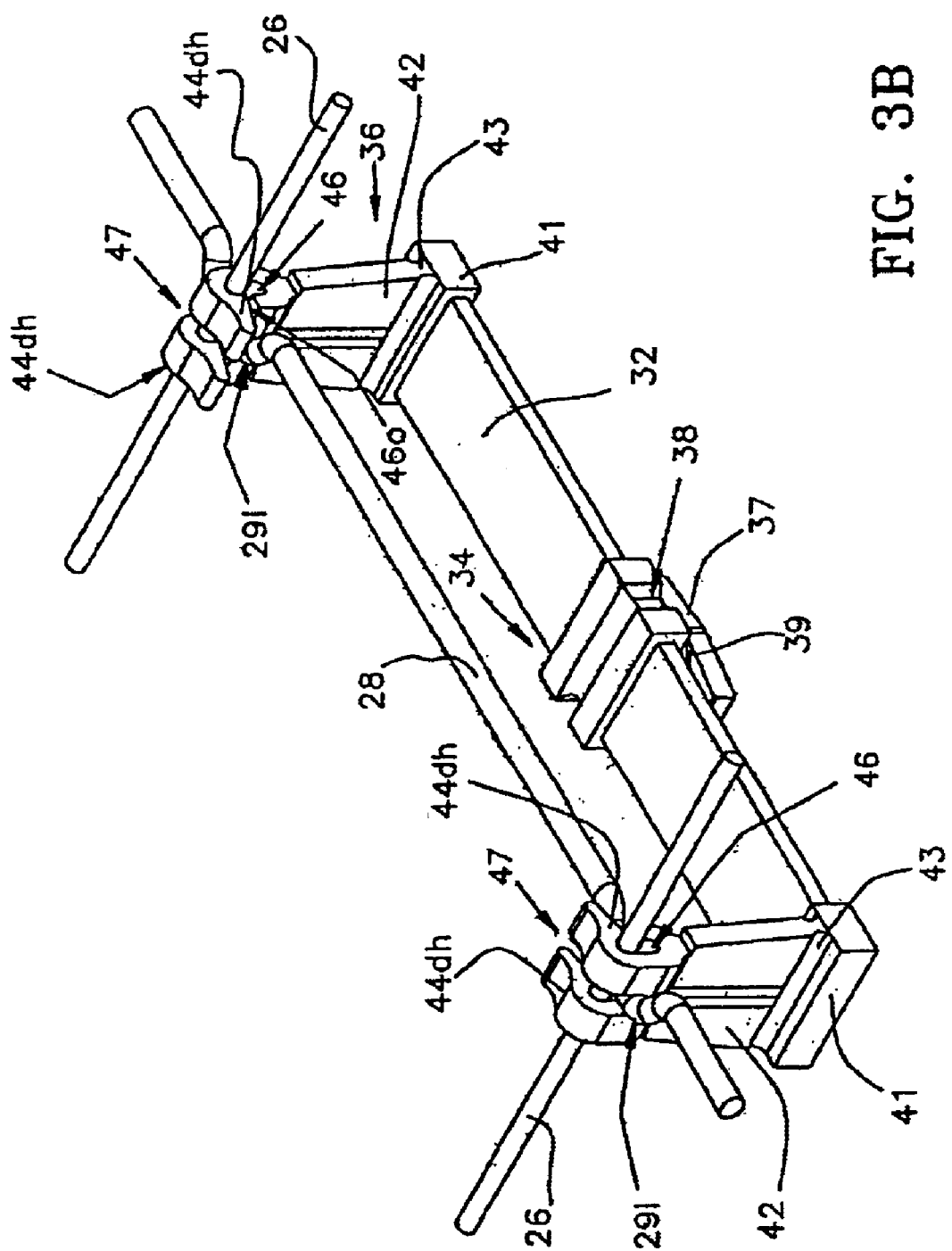

On the grid attachment stanchion fittings of the spring modules of FIG. 1A and FIGS. 3A–3B, each of the gripping fingers 44 include a laterally extending locking tab $44_{dh}$ which is generally aligned with the length of the module body 32 and extends over an interior side opening $46_o$ into channel 46 in which a longitudinal grid member 26 is received in the foundation assembly. The interior side opening $46_o$ allows the longitudinal grid members 26 to easily enter channel 46, and the locking tabs $44_{dh}$, each formed with a downwardly canted underside, guides the grid members 26 through opening $46_o$ into channel 46. Preferably, the height of opening $46_o$ is less than a cross sectional width of member 26, whereby the locking tabs $44_{dh}$ are forced upward as the member 26 passes through opening $46_o$, and then snap down to capture and retain grid members 26 within channel 46.

As shown in FIG. 1B, each of the gripping fingers 44 can alternately be formed with a radiused head 45 which extends over channel 46 dimensioned to receive and frictionally engage grid member 26, similarly, a second channel 47, orthogonal to channel 46, is dimensioned to receive transverse grid member 28. As shown in FIG. 1C, second radiused heads 48 may be provided which extend over channel 47 to frictionally engage transverse member 28.

As shown in FIG. 3A, vertically offset notches 29 in transverse member 28 are spaced to closely straddle the upper distal end of upright member 42 to restrict movement of the grid attachment fittings along the length of transverse member 28. The grid attachment stanchion fittings 36 flexibly secure the intersecting grid members 26 and 28 in the correct relative positioning and facilitate rapid assembly of the foundation. The flexible hinge 43 disposed between the spring module body and the grid enables multi-dimensional live response to any load placed on the grid. Formation of the entire grid attachment stanchion fitting of a flexible plastic is particularly advantageous for the infinite degrees of load deflection, and the complete elimination of any possibility of noise generation at the gripping finger 44/grid attachment interface.

As shown in FIG. 3B, the invention further includes a transverse grid member 28 or crosswire having horizontal lateral offsets 291 of a linear extent sufficient to traverse the second channel 47 which runs between gripping fingers 44. By this arrangement, the grid attachment stanchion fittings 36 are restricted from lateral displacement along longitudinal grid members 26, and from movement along the length of crosswire 28. Furthermore, the horizontal lateral offsets 291 are overlapped by a portion of the locking tabs 44 which strengthens the mechanical engagement of the intersecting grid members within the attachment fittings. The lateral offsets 291 are horizontal in the sense that they extend laterally in a plane defined by the top surface of a grid in which the crosswire 28 is incorporated.

Figure 6C:
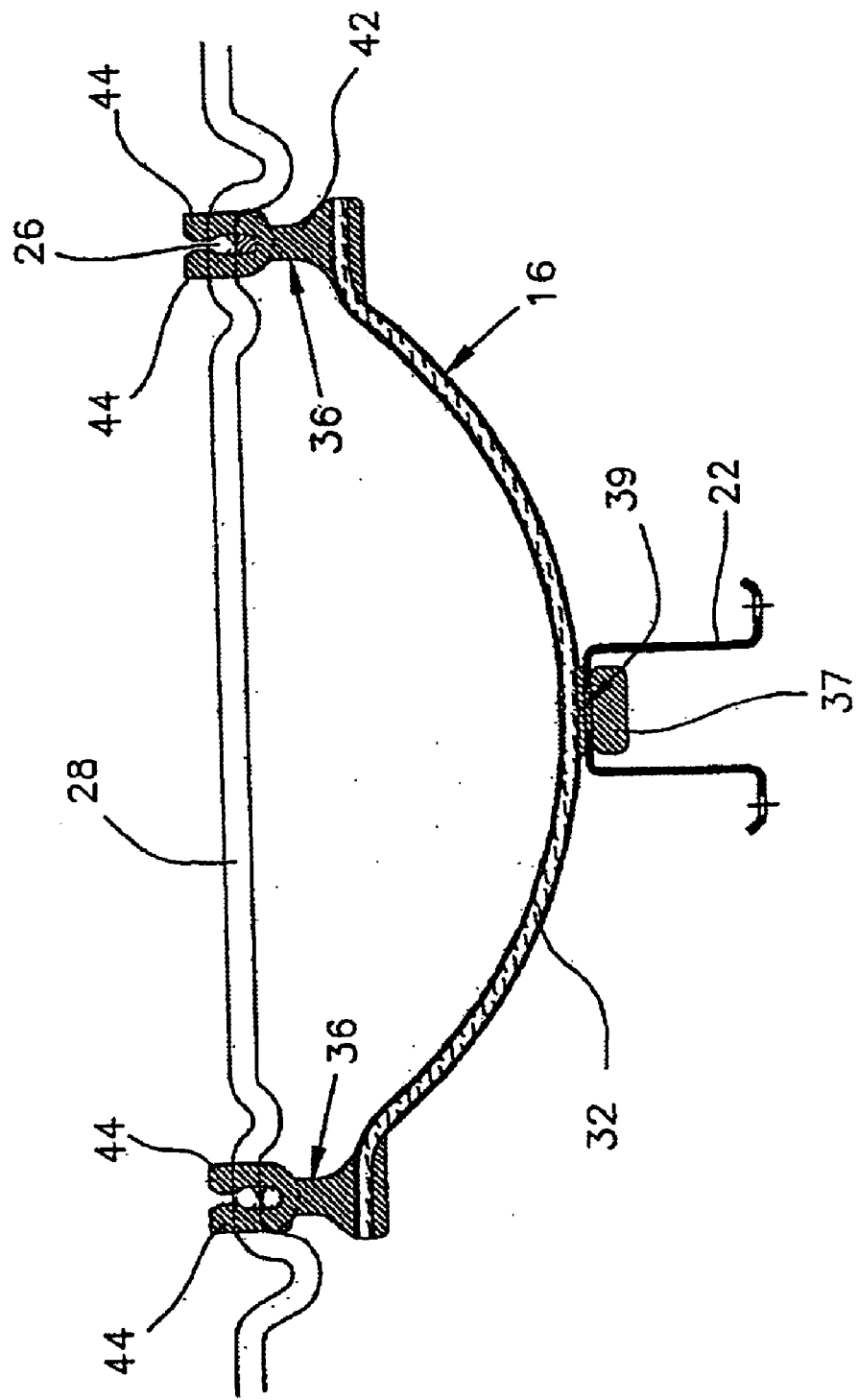
FIG. 6C is an elevation view of a spring module of the invention engaged with a frame member and a grid in a mattress foundation of the present invention.
Figure 6D:
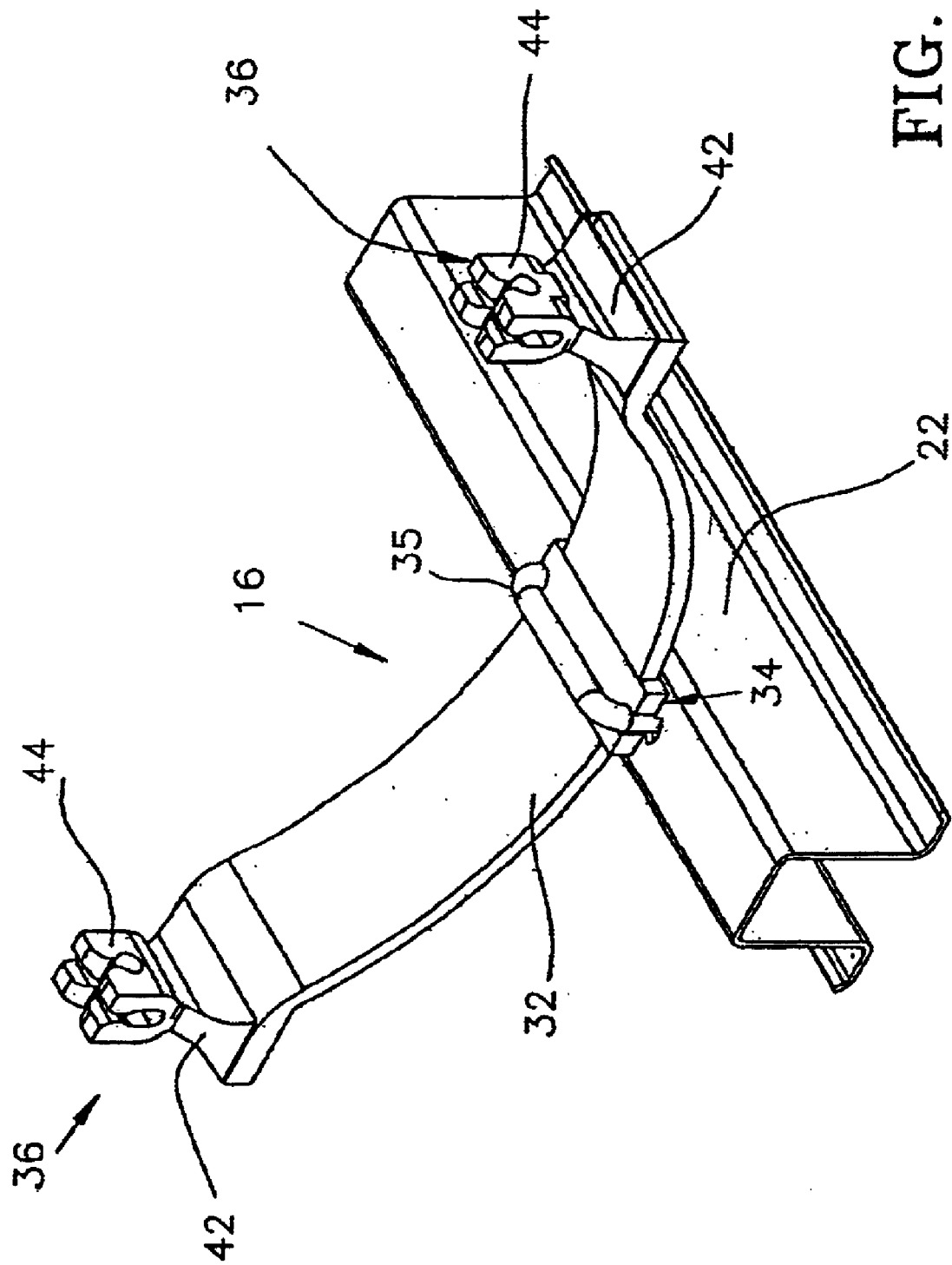
FIG. 6D is a perspective view of an alternate embodiment of a spring module of the invention attached to a frame member of a mattress foundation.

The frame attachment fitting 34 is preferably configured for indexed engagement with an opening in the top of longitudinal frame members 22. For example, a key 37 is formed on the bottom of frame attachment fitting 34 with a length generally aligned with the length of the module body 32. A correspondingly sized hole is provided in the top of the upper longitudinal frame members 22 through which the key 37 is passed and then rotated ninety degrees to mechanically engage with the supporting frame member. For example, a neck 39 (shown in FIGS. 6A and 6B) extending from key 37 has a length dimension greater than a width dimension of the hole in frame member 22 so that edges of the hole impinge upon the neck as it is rotated ninety degrees within the hole, to mechanically and frictionally engage the module with the frame member. Similarly, as shown in FIG. 6A, the length of key 37 may be made longer than the internal width of the channel form of longitudinal member 22 to achieve a binding compression fit of the key along a length dimension with the frame member 22 upon ninety degree rotation. Alternatively, the hole in frame member 22 can be dimensioned at one point to receive the key 37 and neck 39 with clearance, and further include an adjacent smaller area which captures the key when the entire module is slid into the smaller area of the hole. A key configured for sliding engagement in a frame member hole is shown in FIGS. 6B and 6C.

This simple manner of attachment of the modules to the frame structure with the integrally formed attachment fittings 34 and 36 eliminates the need for any separate fasteners to secure the modules to the frame. The fittings 34 and 36 enable extremely simple and fast attachment of the modules 16 to the frame and the overlying grid. The interlocking mechanical engagement of the attachment fittings of the spring modules with a mattress foundation or any other structure such as seating and furniture, is ideally suited for either manual or automated assembly of the foundations of the invention. Also, the inherent flexibility of the fittings 34 and 36 formed of flexible/plastic material (and preferably of a material more flexible than the non-fiber material of the spring body) gives the entire spring module multiple degrees of freedom relative to the frame and grid, and eliminates any possibility of noise generation at the points of connection of the attachment fittings to a frame or grid.

The described foundation as depicted in FIG. 2 has a relatively low height or profile for the reason that the overall height, measured from the bottom surface of the frame to the top of the grid, is substantially less than the height of conventional foundations having wire spring modules which stand as tall as seven or more inches high. The low profile height dimension of the foundation of the invention is attainable as a result of the minimal height dimension of the composite material spring modules 16 and attachment fittings, yet which have deflection characteristics comparable and superior to wire form springs with substantially greater height.

Figure 4:
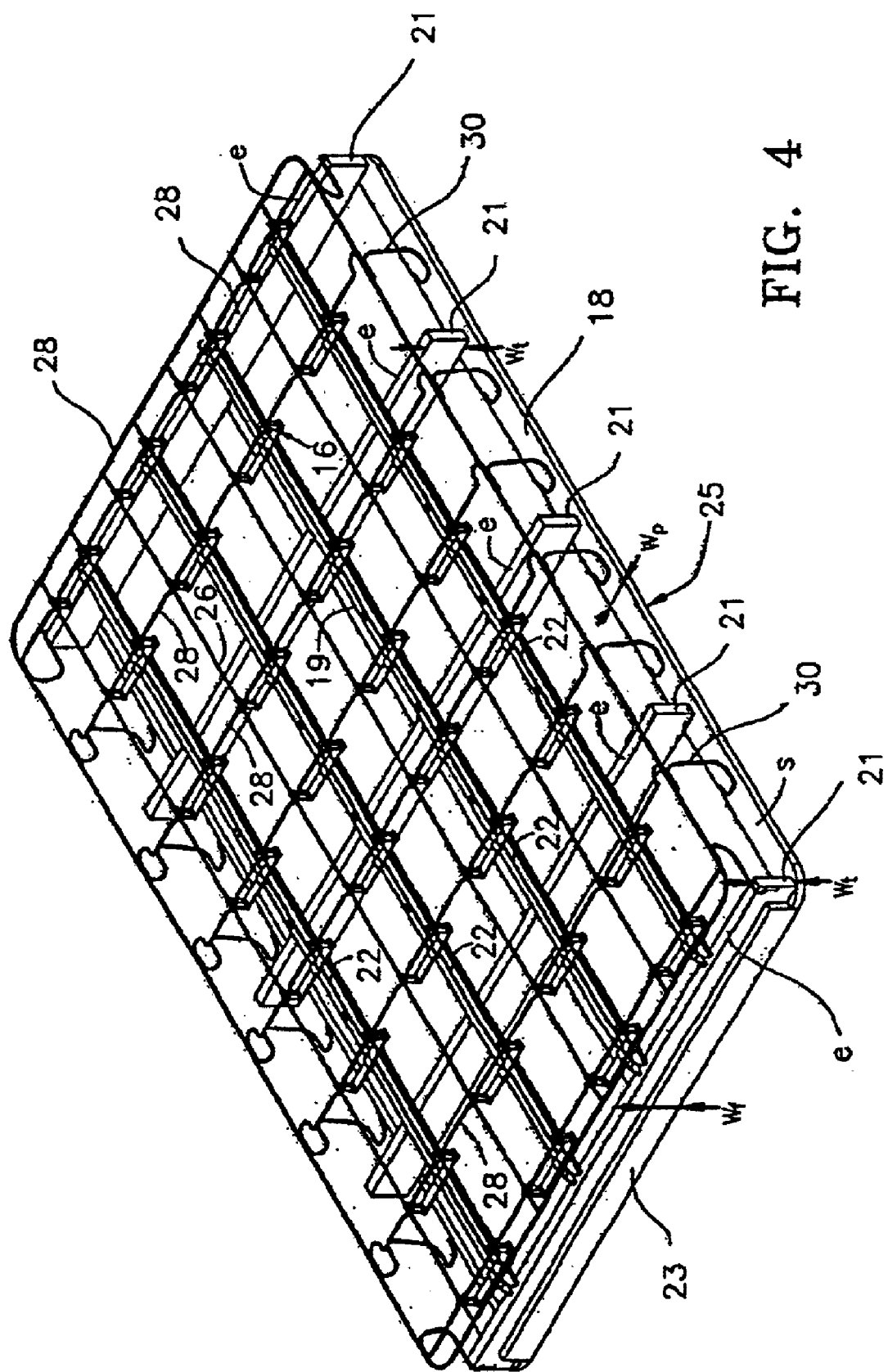
FIG. 4 is a perspective view of a high profile mattress foundation with composite material springs with integrally formed attachment fittings of the present invention.

Nonetheless, the foundation 10 can be constructed with any desired height dimension wherein the modules 16 are free to deflect about the point of attachment to the supporting frame members 22. FIG. 4 illustrates a relatively high profile version of the foundation 10 having a high profile frame, indicated generally at 25, wherein the transverse frame members 21 are oriented with a major width $w_t$ oriented vertically to achieve a greater height dimension which elevates the longitudinal frame members 22 (and spring modules 16) mounted on narrow edge e. In other words, the perimeter members 18 are flat, while the transverse members 21 are upright. The narrow bottom edges of the transverse members 21 rest upon the top surfaces or major widths $w_p$ of the longitudinal perimeter frame members 18 and central longitudinal member 19. The upper longitudinal frame members 22 are attached to the narrow top edges e of the transverse members 21. End fascia strips 23 are similarly vertically oriented along the side of the end transverse members 21, with a major width $w_f$ oriented vertically, perpendicular to the major widths $w_p$ of the longitudinal members, and the narrow bottom edges of the transverse members flush with the bottom of the longitudinal perimeter frame members 18. This construction provides a very stiff frame with the transverse ends reinforced by side-by-side vertically oriented double board thickness. Of course, the rigidity of the transverse members 21 is optimized by loading upon the narrow edges e, on which the longitudinal frame members 22 rest. Additional frame members may be used to achieve even greater heights and stiffness. In a high profile foundation constructed with the high profile frame 25, the vertical support elements 30 of the transverse grid elements 28 are increased in height to extend from the elevated grid 14 down to the longitudinal perimeter frame members 18.

Figure 5:
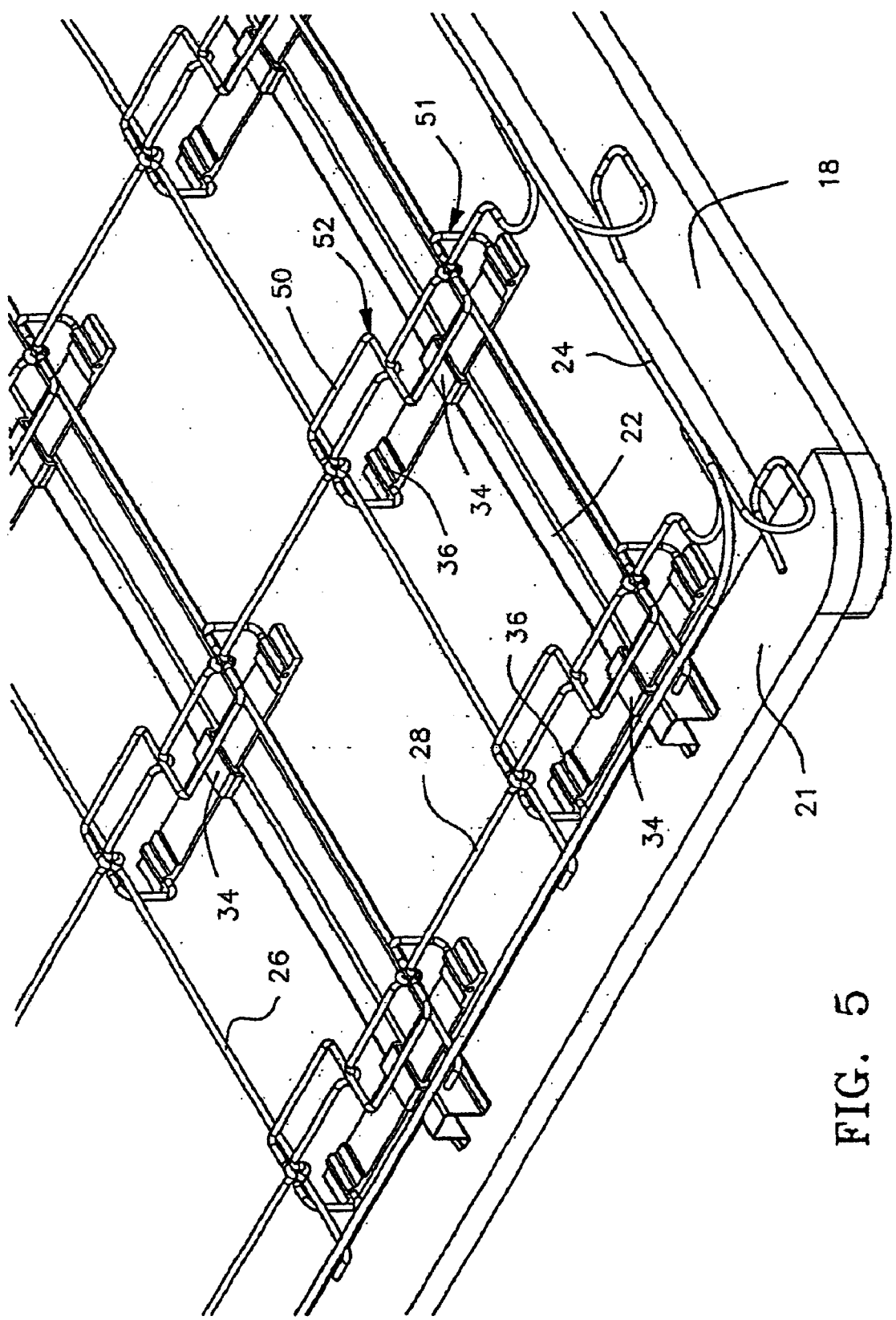
FIG. 5 is a perspective view of a portion of an alternate embodiment of a mattress foundation of the present invention.

Alternatively, the length of upright members 42 of the grid attachment stanchion fittings 36 can be designed to produce any reasonable desired height of the grid over the spring modules and uppermost members of the frame. For example, FIG. 5 illustrates another embodiment wherein the grid attachment stanchion fittings 36 are replaced by a single grid attachment wire 50, the ends 51 of which are formed to engage with an alternate form of attachment fitting 36 and up to the grid interlockingly engaged by an intermediate section 52 between ends 51. The vertical extent of ends 51 can of course be selectively varied in manufacture to produce a foundation of the desired height.

The fundamental concept of the invention of integrally forming attachment fittings with a composite material spring module body can be executed with spring module bodies of any shape or configuration. For example, FIGS. 6A–6D illustrate generally U-shaped or C-shaped configurations of the spring module 16 which have a generally curved body 32 with two generally flat coplanar spring ends from which the grid attachment stanchion fittings 36 extend vertically, with the frame attachment fitting 34 at the approximate center of the body 32. The U-shape spring module 16 is configured such that the compressive stress imparted on the grid of the inventive bed system is absorbed by the spring generally in the depth dimension, and generally along the centerline of the module. In addition, the U-shape spring module is configured and made from a material such that it can be compressed to an essentially planar position without reaching its "spring set" condition. Accordingly, even if the inventive bed foundation is subjected to excessive load conditions, the U-shape spring modules will not be deformed or otherwise caused to fail because even at maximum deflection they will not take a spring set.

FIG. 6B illustrates a U-shaped spring module 16 mounted upon a frame member 22 by insertion of key 37 through a hole in the frame member as described above, and the frictional engagement of the intersecting grid wires by the grid attachment stanchion fittings 36 as also described above. As shown in FIG. 6C, an additional mechanical fastener 35, such as in the form of a wire form or staple, may be attached across fitting 34 to further secure the module to the frame member. For such fastener securement, as shown in FIGS. 1A and 1B, an indexing groove 38 may be provided in fitting 34 to receive fastener 35, as shown secured to a frame member in FIG. 6D. For fastener securement of the spring module to, for example, a planar surface of a support structure such as a frame member, the key 37 and neck 39 could be eliminated to achieve flush stable mounting. In this case the body of the frame attachment fitting 34 in which groove 38 is formed still performs an attachment function or seating the fastener.

Figure 7:
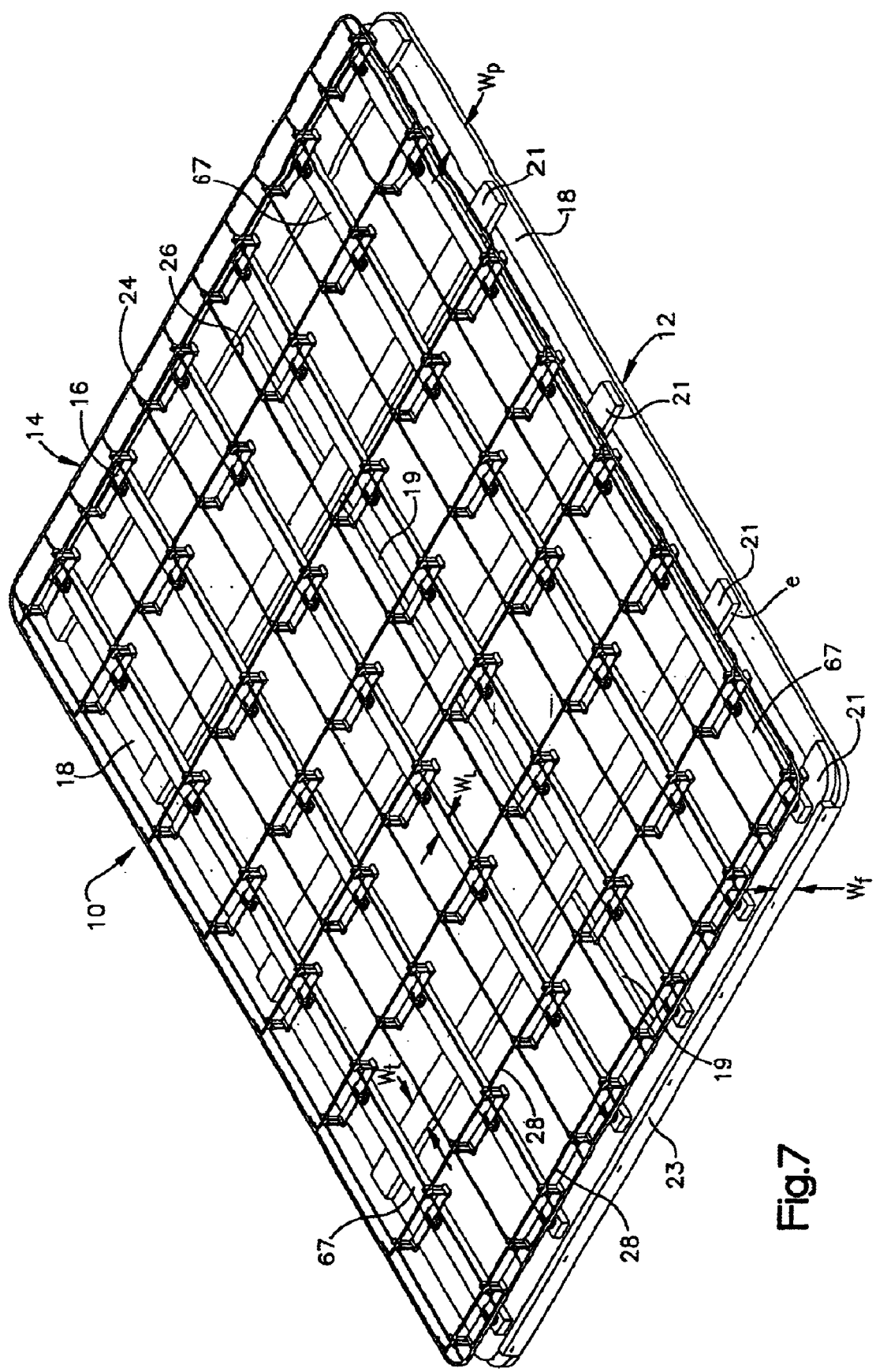
FIG. 7 is a perspective view of a low profile version of a mattress foundation frame and spring structure constructed in accordance with the present invention.

FIG. 7 illustrates a low profile mattress foundation 10 having a plurality of composite spring modules 16 constructed in accordance with the invention. The foundation 10 includes low profile frame, indicated generally at 12 which supports a plurality of composite material spring modules 16 attached to a grid or matrix 14 disposed parallel to and above frame 12 as a flexible support surface. As with the other embodiments, the invention is not limited to mattress foundations, and can be effectively employed as any type of flexible support surface such as in domestic and commercial furniture which includes a frame structure which supports spring elements. In this embodiment, frame 12 includes two longitudinally extending perimeter members 18, a central longitudinal member 19, and a plurality of transverse members 21 which extend from one perimeter member 18 to the other. The members of the frame may be wood, metal, plastic, or engineered plastic such as molded compounds including molded inorganic or organic materials. In the low profile frame the transverse members 21 are laid flat with a major width $w_t$ parallel to and flush against the major widths $w_p$ of perimeter members 18 and central longitudinal member 19, and the narrow edges e orthogonal to the top surfaces of members 18 and 19. Upper longitudinal frame members 67 are attached orthogonal to the major widths $w_t$ (top surfaces) of transverse members 21. An end fascia board or strip 23 is attached to each transverse end of the frame, against the outer narrow edge of the transverse end perimeter members 21 at the ends of the longitudinal perimeter members 18. A major width $w_f$ of fascia board 23 is thereby perpendicular to the major width $w_t$ of end transverse members 21 and a bottom narrow edge of the fascia board is flush with bottom surfaces of the longitudinal members. The bottom edge of the fascia strip 23 is flush with the bottom surfaces of the perimeter frame members to create a smooth continuous surface for attachment of upholstery. The fascia board 23 may extend vertically above the end transverse members 21 to provide a chock against which the ends of upper longitudinal frame members 67 abut. With the upper longitudinal frame members 67 cut to equal length, abutment of the ends against the fascia strips 23 insures that the frame will be chocked and squared when the members are fastened together.

Figures 8A, 8B:
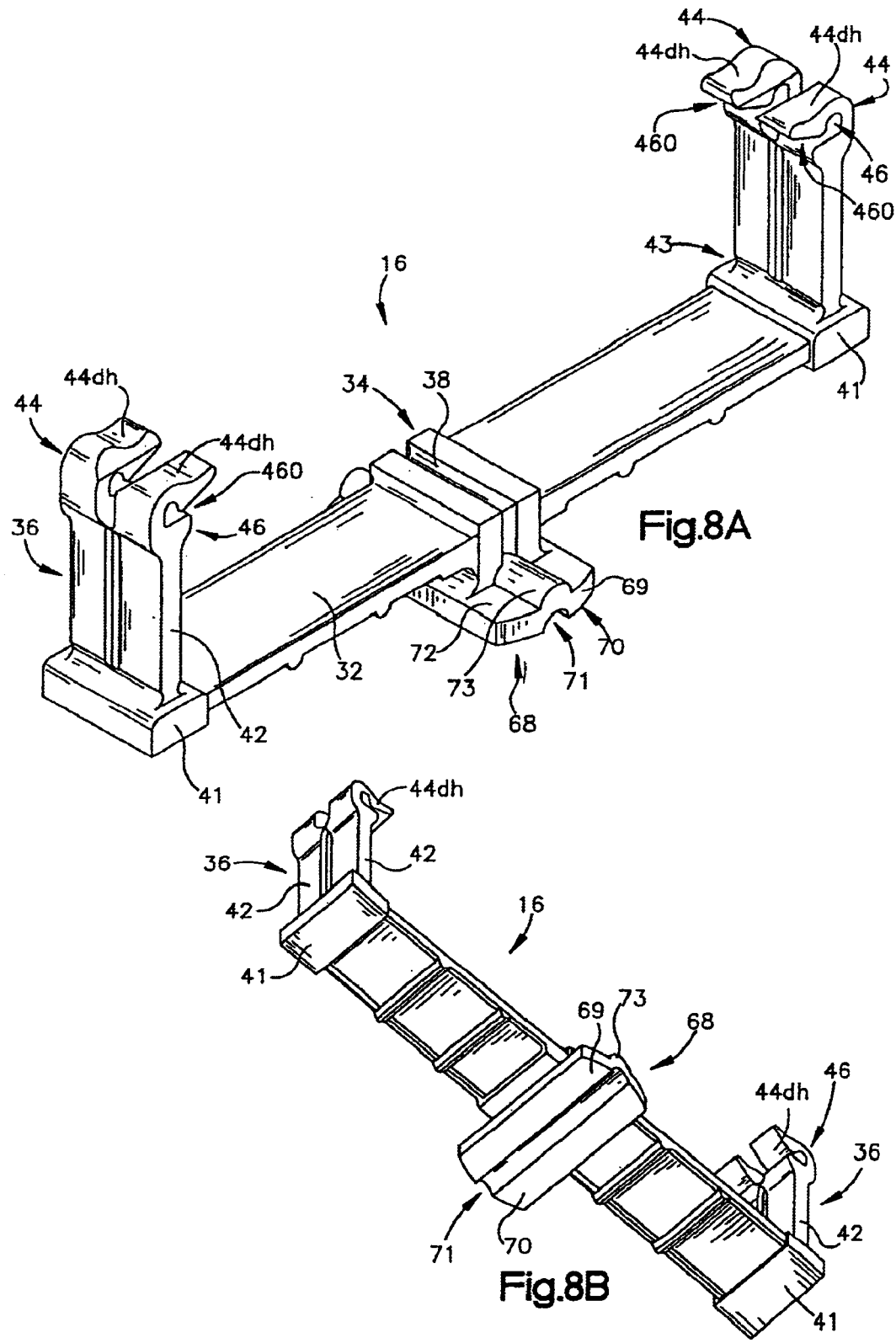
FIG. 8A is a perspective view of a preferred embodiment of a composite material spring module configured for direct mounting to a supporting surface of a frame member of a structure.
FIG. 8B is a bottom perspective view of a preferred embodiment of the composite material spring module of FIG. 8A.

FIGS. 8A–8B show a composite spring module 16 designed with a foot support member 68 that is configured for direct mounting and engagement with a planar surface, such as the top of longitudinal frame members 67, which have a generally rectangular cross-section, or other configuration which provides a mounting surface for the spring modules 16. The base 69 of the foot support member 68 is generally planar. The contact surface 70 of the base 69 is primarily flat. A channel 71 runs longitudinally through the center of the contact surface 70. The top surface 72 of the base 69 is also generally flat, but where the contact surface 70 has a channel 71, the top surface 72 of base 69 has an indexing ridge 73. The channel 71 and the indexing ridge 73 both run through the center of base 69 and are aligned with indexing groove 38 so that the spring is centered directly above the channel 71 and indexing ridge 73. When the foot support member 68 is secured to the frame member 67, the foot support member 68 is aligned so that the center of the base 69 is located at the center of width $w_L$ of frame member 67.

Figure 9A:
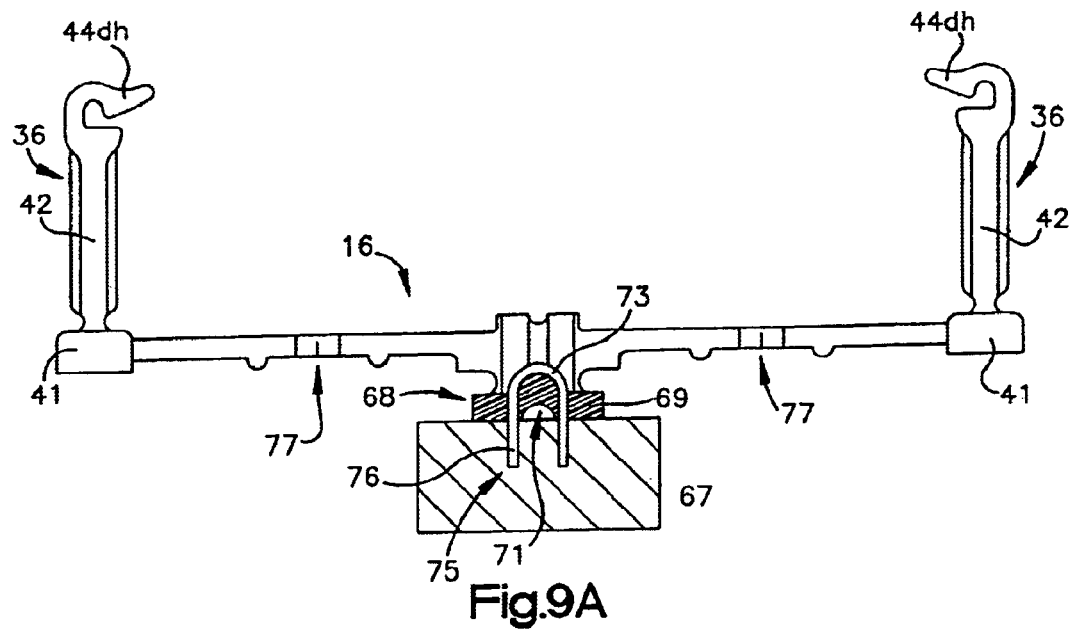
FIG. 9A is a cross-sectional view of a composite material spring module attached directly to a frame member of a spring structure.
Figure 9B:
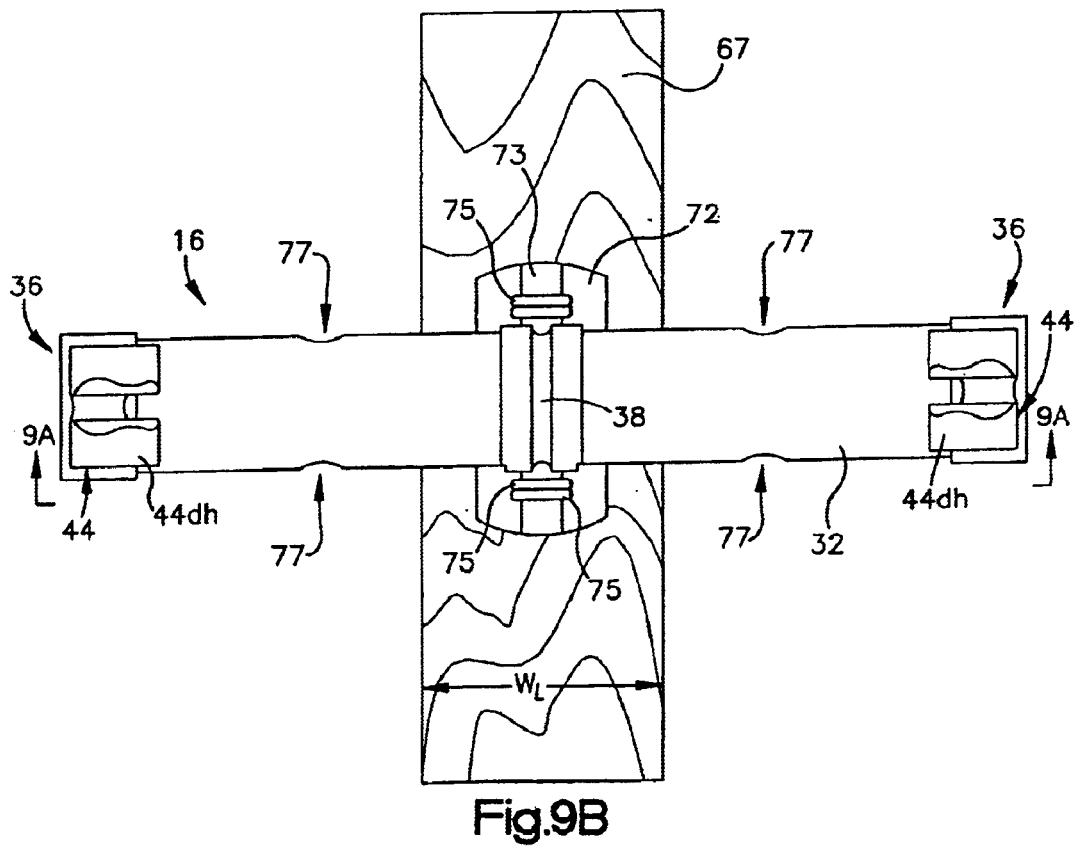
FIG. 9B is a overhead view of a composite material spring module attached directly to a frame member of a spring structure.

As shown in FIGS. 9A and 9B, base fasteners 75 are used to secure the foot support member 68 directly to the planar surface of the supporting frame member 67. U-shaped staples are used in the preferred embodiment, however, nails, bolts, screws, rivets, pins, glue or any other fastener and equivalents such as would occur to one skilled in the art may be used. To secure the base 69 to the frame member 67, fasteners such as U-shaped staples 75, are driven through the top surface 72 of the base 69 into the frame support member 67. Indexing ridge 73 is designed to accept the U-shaped staple so that there is flush contact between the ridge 73 and the staple 75. The indexing ridge 73 acts as a guide for the placement of staples 70. When staples are driven through the base 69, the tines 76 of the staple 75 are located on opposing sides of the indexing ridge 73. The indexing ridge 73, therefore, ensures that the staples 75 are aligned with each other, as well as with the center of the spring 16 and the lateral center of the foot mounting member 68. This alignment mechanism facilitates both manual and automated fixation of the foot support member 68 to the frame member 67, as for example by use of a powered staple gun.

Figure 10:
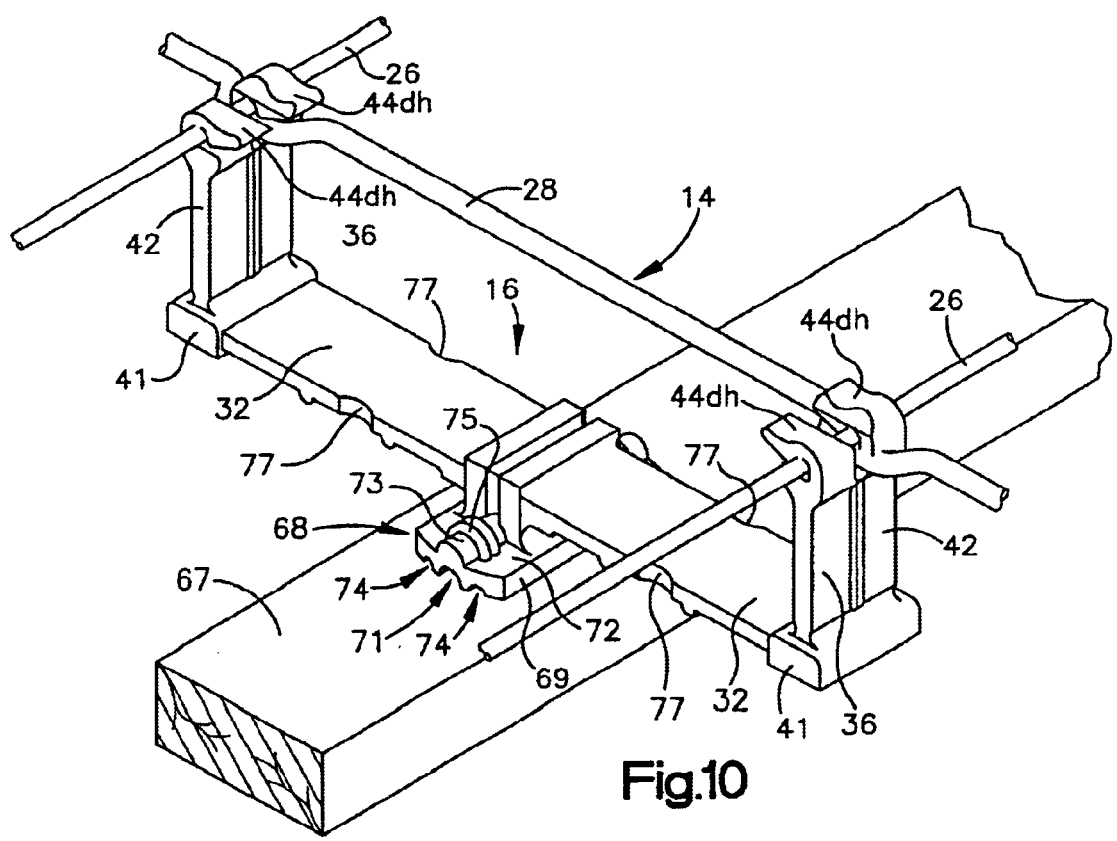
FIG. 10 is a perspective view of a composite material spring mounted upon a frame member and attached to intersecting wires of an overlying grid.

FIG. 10 illustrates a single spring module 16 attached to a frame member 67 and engaged with the intersecting wires 26, 28 of the overlying grid 14. This drawing illustrates that placement of the foot mounting member 68 upon the planar surface of frame member 67 must be precise in order to accurately position the gripping fingers 44 of the grid attachment stanchion fittings 36 at the intersection of wires 26 and 28. As for example in the case where the frame member 67 is a stock piece of hardwood without calibration or markings, it must be matched in the length to the dimensions of the grid 14 to determine the correct location of each of the spring modules to be attached to the frame member, prior to engagement of the spring modules with the grid. Otherwise, the frame members and spring modules must be correctly registered in location for attachment by a jig assembly system of the type disclosed and claimed herein.

FIGS. 11–15 illustrate an assembly jig for calibrated or measured attachment of spring modules 16 to a frame member 67, so that the spring modules are correctly positioned to engage with the intersections of the wires of the grid, when the frame members are assembled together. FIGS. 11A–11C show the assembly jig 78 used to place and secure composite springs 16 to frame members 67. For maximum load distribution and stability, composite springs 16 are aligned with each other along the longitudinal center axis of each frame member 67. The assembly jig 78 includes a channel 79, such as an extrusion, upon which a plurality of blocks 80 are slidably mounted. The blocks 80 nearest the ends of the channel 79 are fitted with end stops 81. During assembly, a frame member 67 positioned linearly within each of the blocks 80 and between the end stops 81. The blocks 80 are spaced apart such that the distance between the two end stops 81 is equal to the length of the frame member 67 inserted in the assembly jig. The number of blocks 80 on the channel 79 is selected according to the number of springs to be attached to the frame member.

Each block 80 is made up of a slide 88 attached to a jig block 98.

Figure 12:
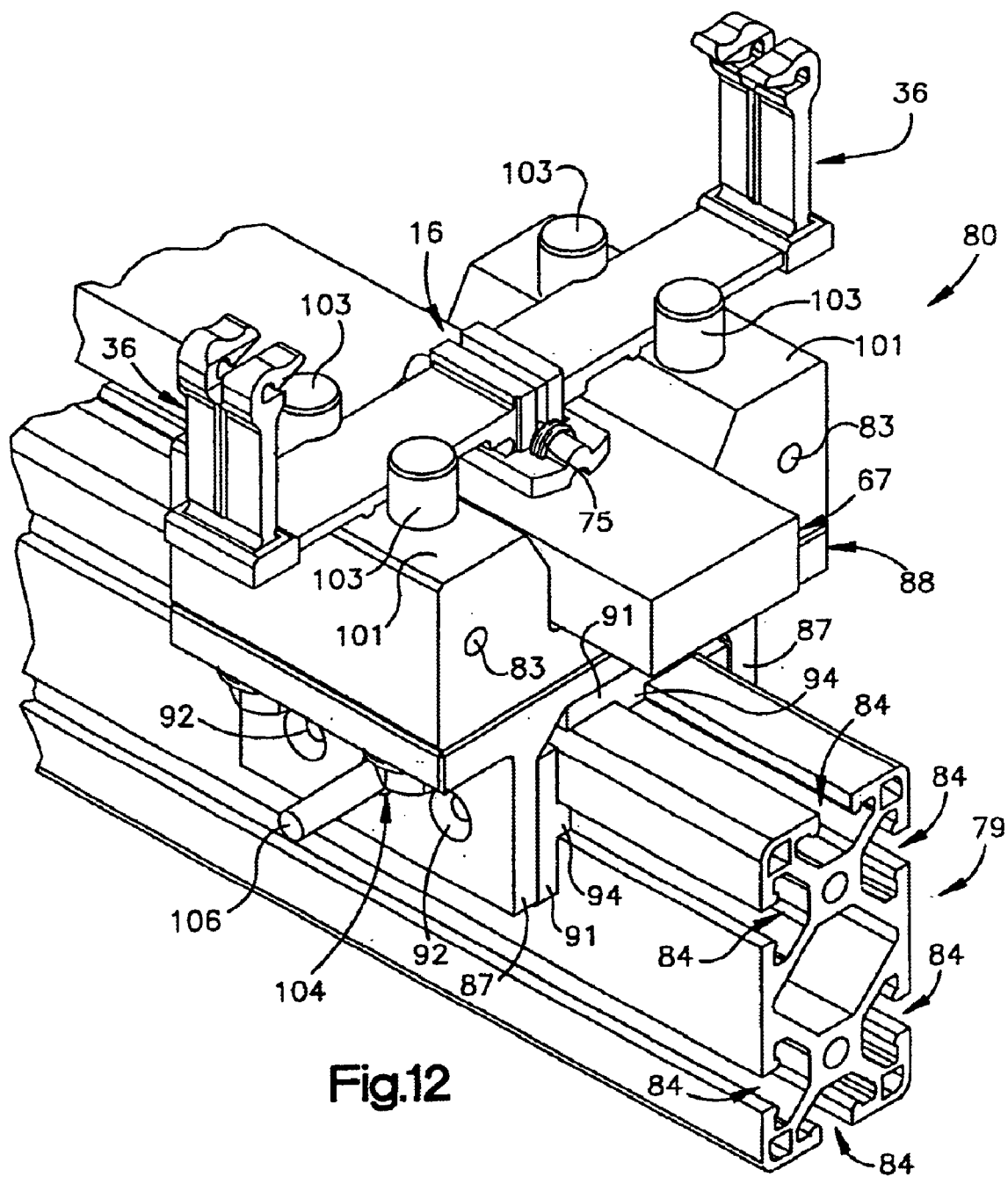
FIG. 12 is a perspective view of a portion of an assembly jig of the invention.
Figure 13:
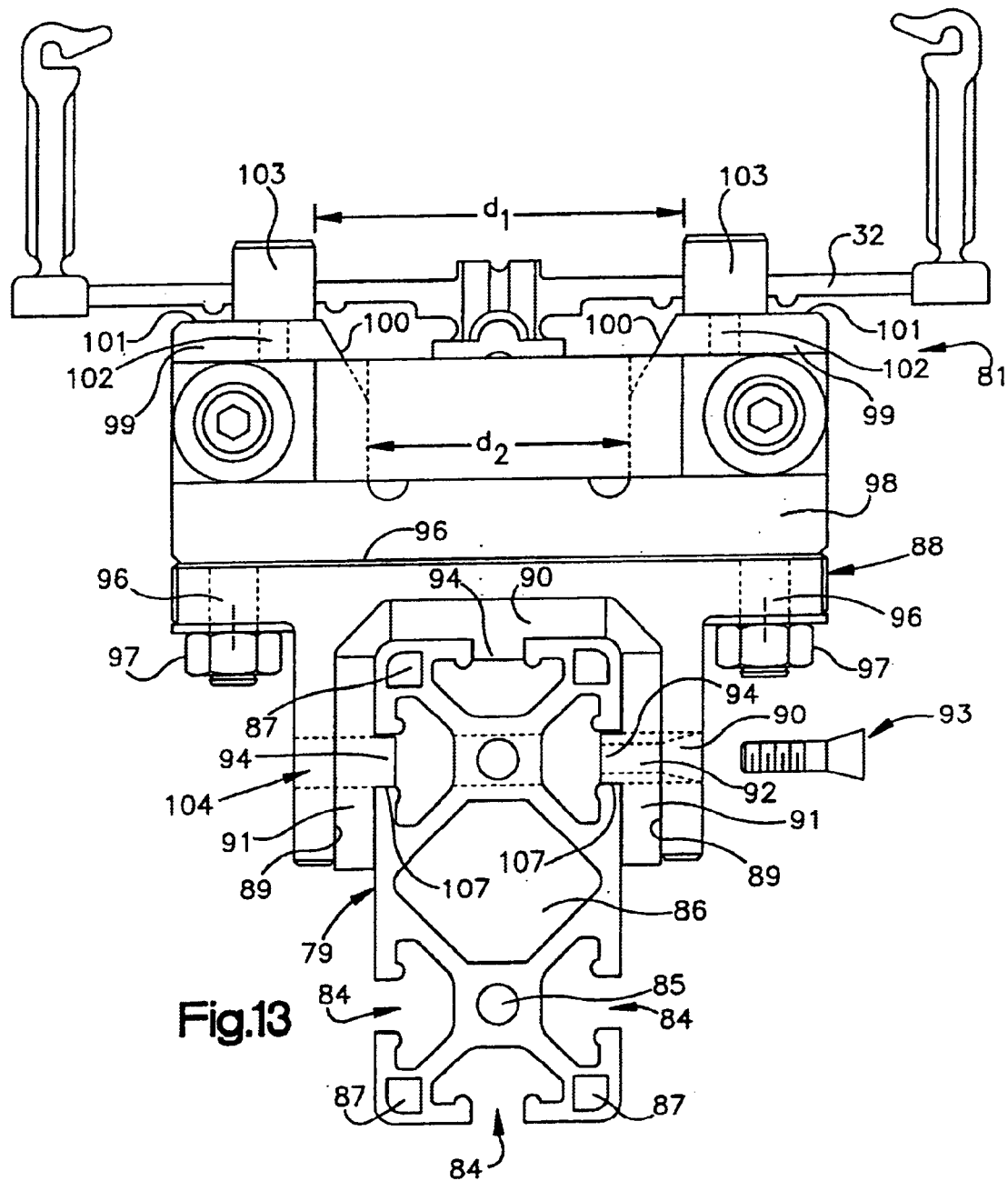
FIG. 13 is a cross-sectional view of an assembly jig of the invention.

As shown in FIGS. 12 and 13, the jig channel 79 in one form has a cross-sectional configuration of symmetrical joined X-frame structures with webs 85 which form three slot channels 84 in opposing halves of the channel. The jig channel 79 is preferably made of extruded aluminum, but formation out of high strength synthetic and polymeric materials is also possible.

Slides 88 are mounted on the jig channel 79, with laterally opposed downwardly extending flanges 87 which straddle and overlap the lateral slot channels 84. Slides 88 may also be constructed of aluminum or an aluminum alloy. Glide pads 91 are attached to the interior surfaces of the flanges 87 for direct contact with the jig channel 79 and bearing surfaces of the slot channels 84. Glide pads 91 are preferably made of a material having a low coefficient of friction when in contact with the channel surfaces. Many plastics possess this quality in contact with metal such as aluminum. One such plastic is such as Ultra High Molecular Weight Polyethylene. Nylon is also suitable. Lubricant such as silicon can be applied at the material interface to further reduce friction.

The glide pads 91 extend beyond the T-slot channels 84 to at least a portion of the periphery of the jig channel 79. Fasteners 93 attach the glide pads 91 to the interior periphery 89 of the guide block 88. The glide pads 91 have holes 92 that receive fasteners 93. The guide block 88 has tapered openings 90 formed therein such that the fasteners 93 mount flush against the outside of the surface of the guide block 88. The glide pads 91 are the only parts of the assembly that may eventually need replacing. Replacement is quickly and easily accomplished by removal of fasteners 93 that mount the pads 91 to guide blocks 88.

The glide pads 91 each have alignment keys 94 which engage slot channels 84 to index the guide block 88 to slide smoothly upon jig channel 79. The alignment keys 94 may be integrally formed as extensions of the glide pads 91. The alignment keys 94 are preferably substantially rectangular in cross-section. Furthermore, the alignment keys 94 may extend along the longitudinal length of the glide pad 91. In the preferred embodiment, three alignment keys 94 formed on the first surfaces 95 of three glide pads 91 engage three separate slot channels 84 of the jig channel 79, thereby holding the guide block 88 secure in all three x-y-z axes.

Running through the guide block 88 and glide pads 91 on opposing sides of guide block 88 are locator holes 107. The locator holes 107 are used for positioning the guide block 88 and wear pads 91 along the length of jig channel 79 by indexing pins 106 which extend through holes 107 into calibrated holes in the jig channel 79, to set and fix the spacing of the blocks 80.

Figure 14:
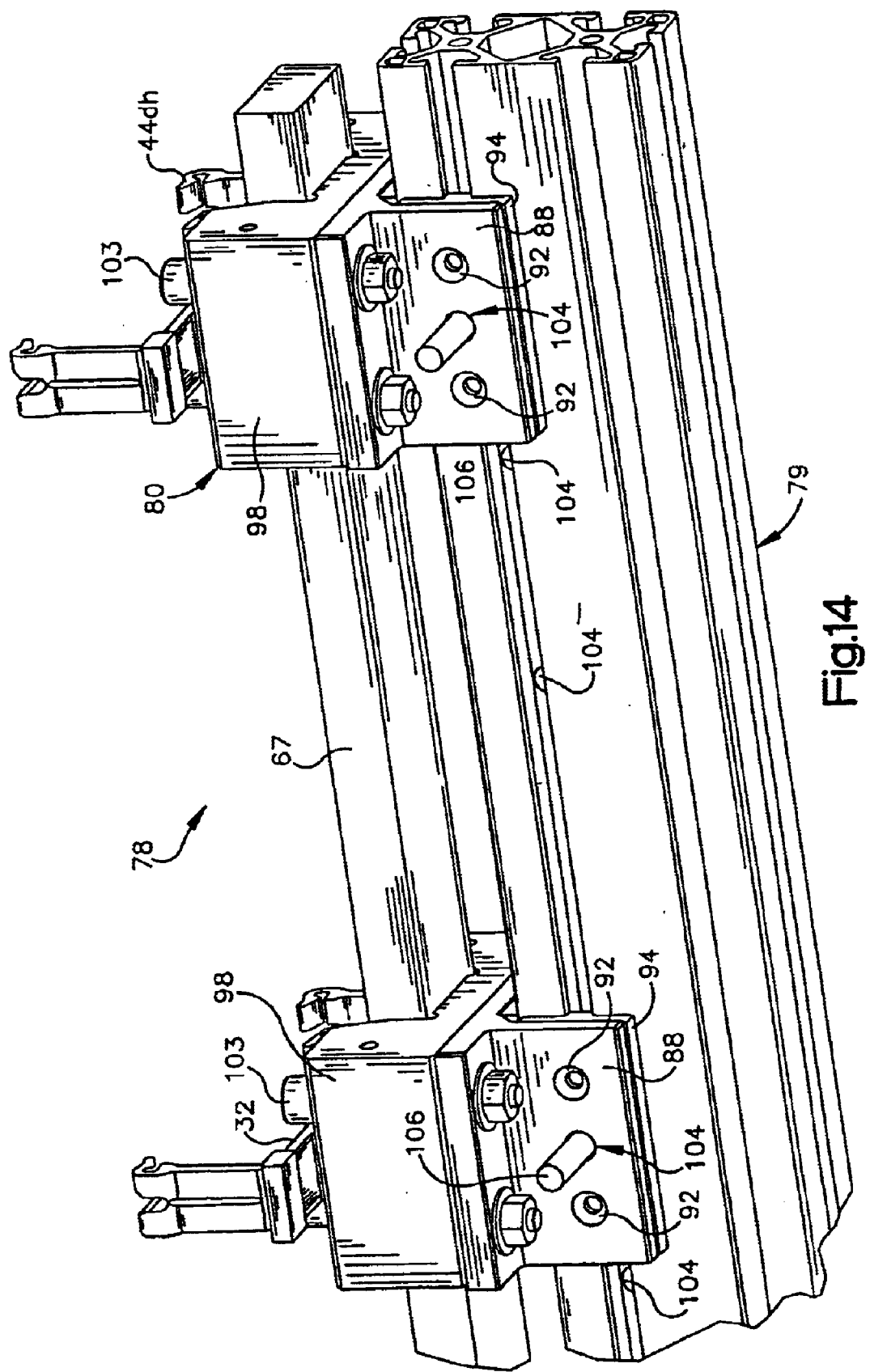
FIG. 14 is a perspective view of two blocks mounted and spaced apart on a jig channel of an assembly jig of the invention.
Figure 15:
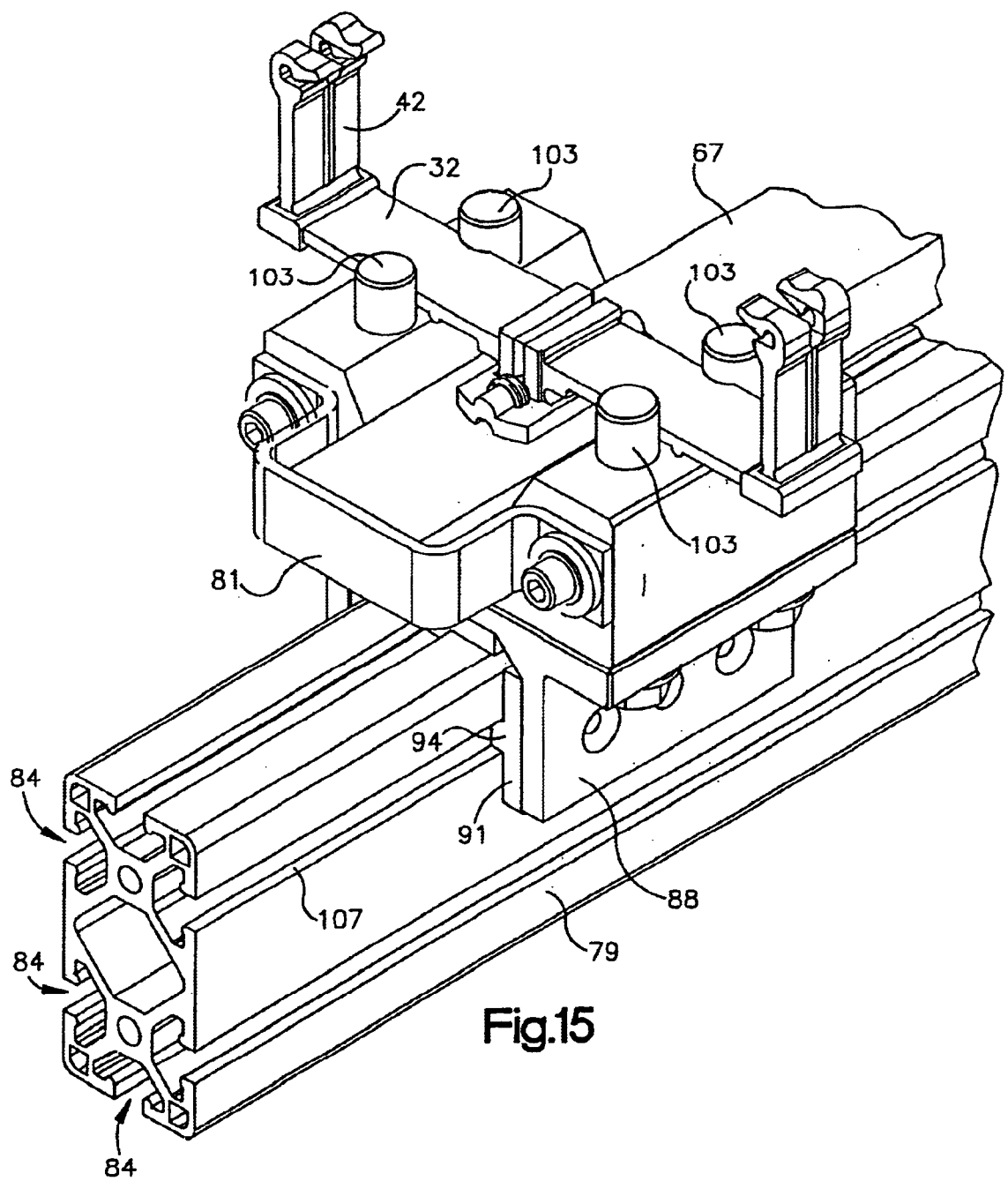
FIG. 15 is a perspective view of an end portion of an assembly jig of the invention.

As shown in FIGS. 13 and 14, four mounting bolts 97 extend from each jig block 98 down through mounting apertures 96 in the horizontal planar portion of each slide 88. The jig block 98 may be fastened to the mounting bolts 97 or comprise mounting bolt apertures configured to accept a threaded mounting bolt 97. The jig blocks 98 are preferably formed of machined aluminum, but could be made of other materials such as plastic or wood.

Each jig block 98 comprises a base 96 which sits on the top surface of slide 88, and laterally opposed walls 99. The interior opposing surfaces 100 of walls 99 are beveled toward the center of the jig block 98 so that the distance $d_1$ between centering members at the top surface 101 of laterally opposed sides 99 is greater than the distance $d_2$ between laterally opposed sides 99 at the base 96. The opposing beveled interior surfaces 100 facilitate insertion and positioning of the frame member 67. The distance d between the laterally opposed sides 99 decreases toward the base of the block 80 so that a frame member 67 can be easily located between the laterally opposed sides 99, while providing a snug fit for the frame member 67 between laterally opposed sides 99 when frame member 67 is placed on the base 98 of the block 80.

FIGS. 12 and 13 illustrate a composite spring 16 position upon a frame member 67 within a jig block 98. On the top surface 101 of each of the two laterally opposed walls 99 of the jig block 98 are two holes 102 configured to accept spring positioning pins 103. The spring positioning pins 103 are generally cylindrical, however other shapes such as rectangular pins may be used as well. The spring positioning pins 103 are specifically configured for indexing within the jig detents 77 in the edges of the body 32 of each composite spring module 16 (best shown in FIG. 9B).

When a spring 16 is inserted into the jig block 98, the jig detents 77 align with the spring positioning pins 103. The four spring positioning pins 103 force the spring 16 into orthogonal alignment with the frame member 67. The locations of the spring positioning pins 103 and corresponding jig detents 77 function to center the channel 71 and indexing ridge 73 of the foot support member 68 over the horizontal width $w_L$ of the frame member 67. This places the center of mass of the spring 16 directly over the center of mass of the frame member 67 for maximum stability. The placement pins further function to prevent the spring 16 from moving before it is secured to the frame member 67 by fasteners such as staples 75.

FIG. 12 shows a partial perspective view of jig 78, including block 80 and jig channel 79. Because mattresses vary in size, the length of longitudinal frame members 67, as well as the locations of the springs 16 along the frame members 67 will vary. Thus, in order to use a single jig 78 to manufacture various types of mattress frames, the distances between the blocks 80 along the jig channel 79 must be adjustable. To create an adjustable jig 78, a plurality of locator holes 104 pass through and intersect opposing slot channels 84 and frame structure 85 of jig channel 79. The placement of the locator channels 104 corresponds to the desired placement of composite springs 16 on frame member 67. Locator holes 107, running through slides 88 and glide pads 91, are aligned with the desired locator hole 104 in channel 79. A locator pin 106 is inserted through the locator holes 107 and 104, thereby securing the slide 88 and jig block 98 in place. The locator pin 106 is a pin or a rod in the preferred embodiment because it is easily placed through and removed from the locator holes 107 and locator channel 104.

Once the blocks 80 are secured in place along jig channel 79, frame member 67 is placed in the jig blocks 98 and between end stops 81. The composite springs 16 are then positioned between the pins 103 of each block 80 and fastened to the frame member 67 using a fastener, such as staple 75. The frame member with secured composite springs 16 is then ready for assembly as a longitudinal frame member 67 in a mattress foundation 10.

Figure 16:
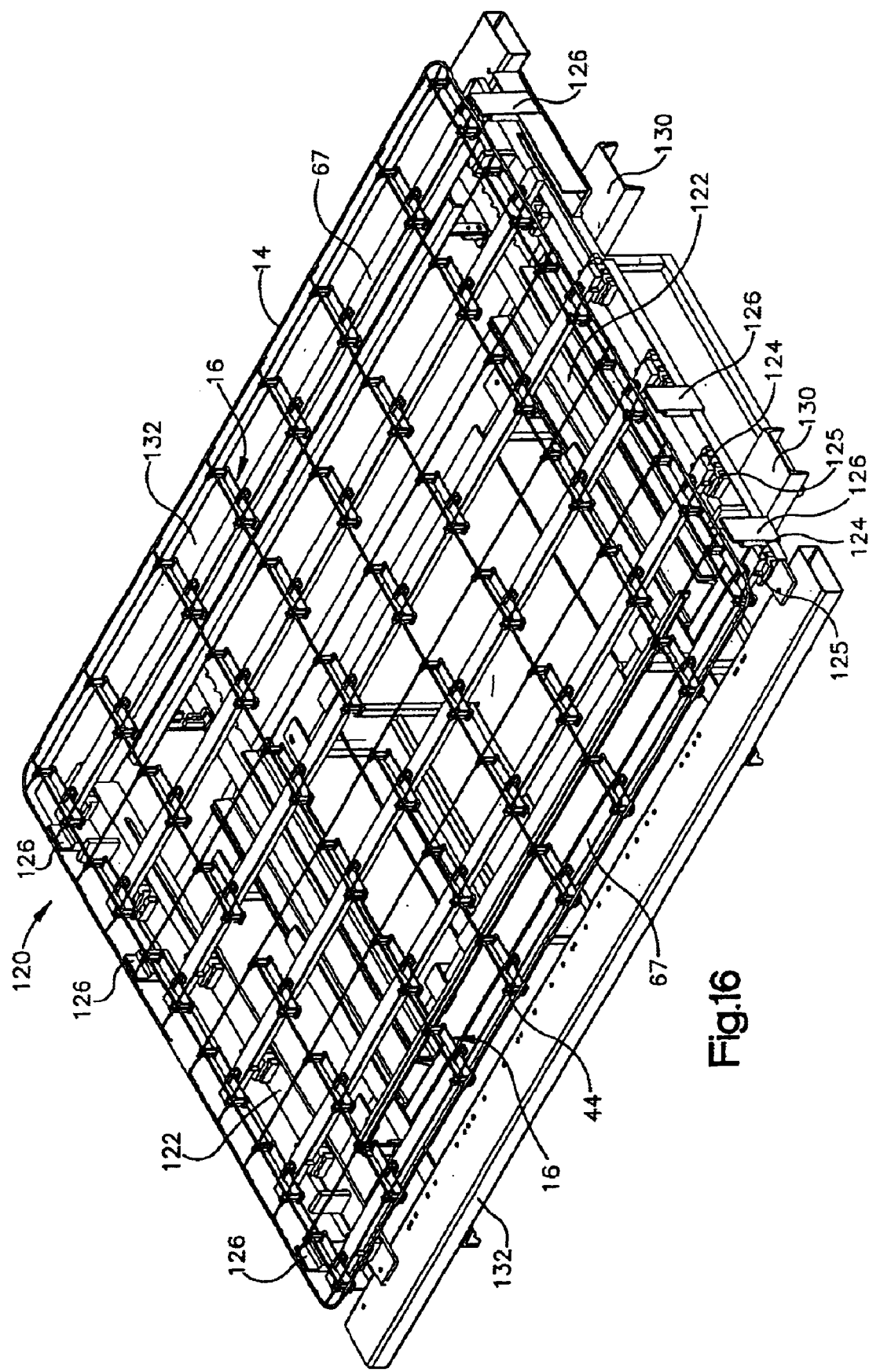
FIGS. 16, 17 and 18 are perspective views of a mattress foundation assembly jig showing frame members with composite material spring modules attached and a grid attached to the spring modules.
Figure 17:
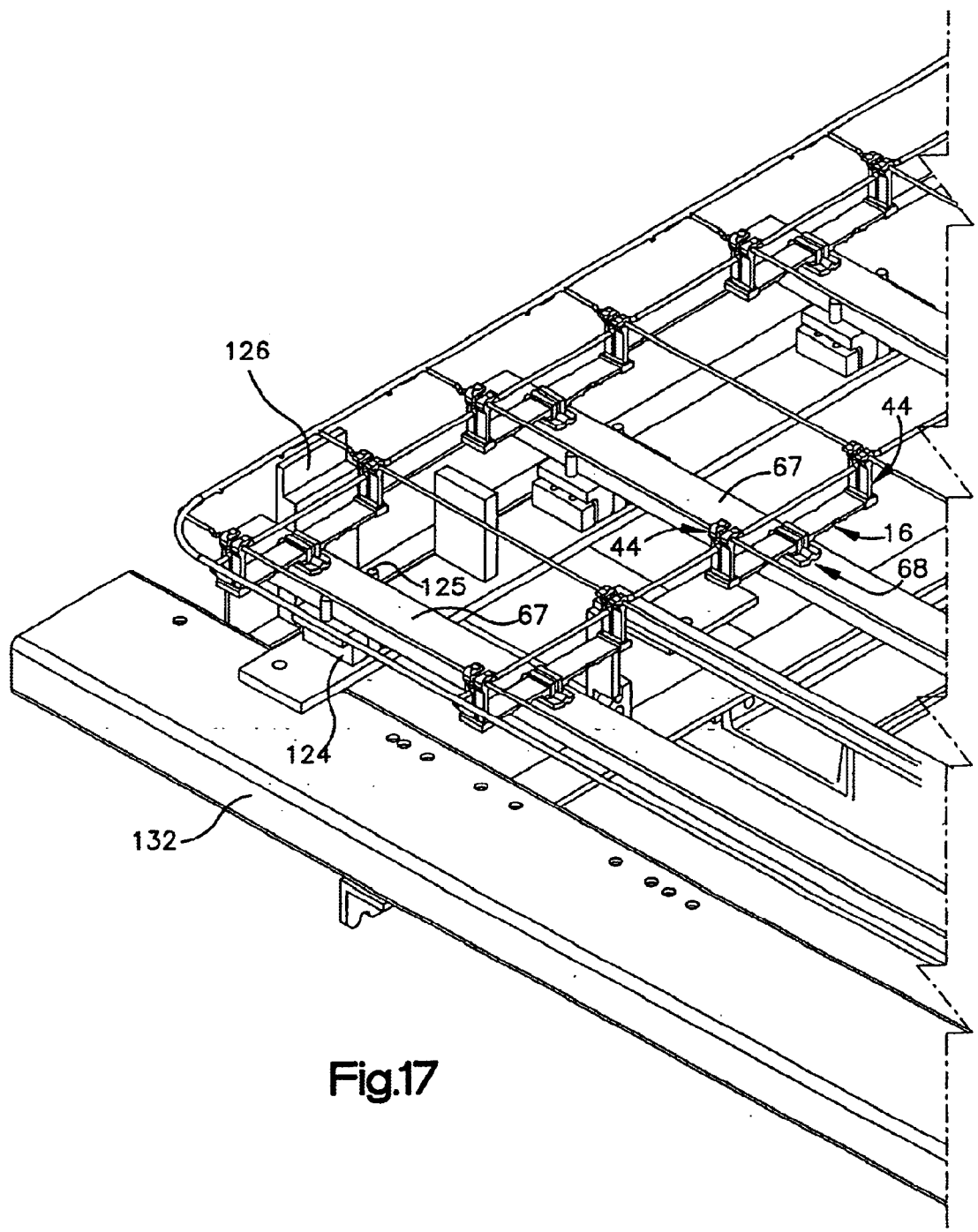

As shown in FIGS. 16 and 17, with the spring modules thus attached, the frame members 67 are positioned in parallel within a grid attachment jig, indicated generally at 120. The grid attachment jig 120 is a framework which includes two spaced apart rows of frame member support structures 122, with pedestals 124 on which ends of the frame members 67 rest. Each pedestal 124 has a pair of spaced apart pins 125 between which the ends of the frame members fit. With each frame member 67 positioned upon the pedestals 124, the grid 14 is positioned by locator guides 126 over the spring modules 16 on the frame members, and the intersections of the grid are interconnected with the attachment fittings 44 of the spring modules 16. The grid attachment jig 120 is preferably mounted upon a stand or table, which may have support rails 130 as shown. This elevates the jig to an appropriate table or work height for manual use. Side ledges 132 of the jig are provided with calibrated rules on the spacing of spring modules (and corresponding grid sizes) for mattress foundations of different sizes, such as double, queen and king. The previously described jig 78 for attachment of spring modules to the individual frame members 67, can be attached to the side ledges 132, so that as a frame member 67 is completed with the springs, it is inserted directly into the grid attachment jig 120. The jig channel 79 of jig 78 can be mounted to the side ledges 132 in a drop down or hinged manner, whereby it is effectively moved out of a worker's way. This can be done by use of articulated mounts which lock in an upright position, where the jig 78 would be positioned next to the side ledge 132, and lock in a down or retracted position with the jig 78 located under or beneath the side ledge 132, so that it does not interfere with the assembler inserting the frame member 67 into the grid attachment jig 120.

Figure 18:
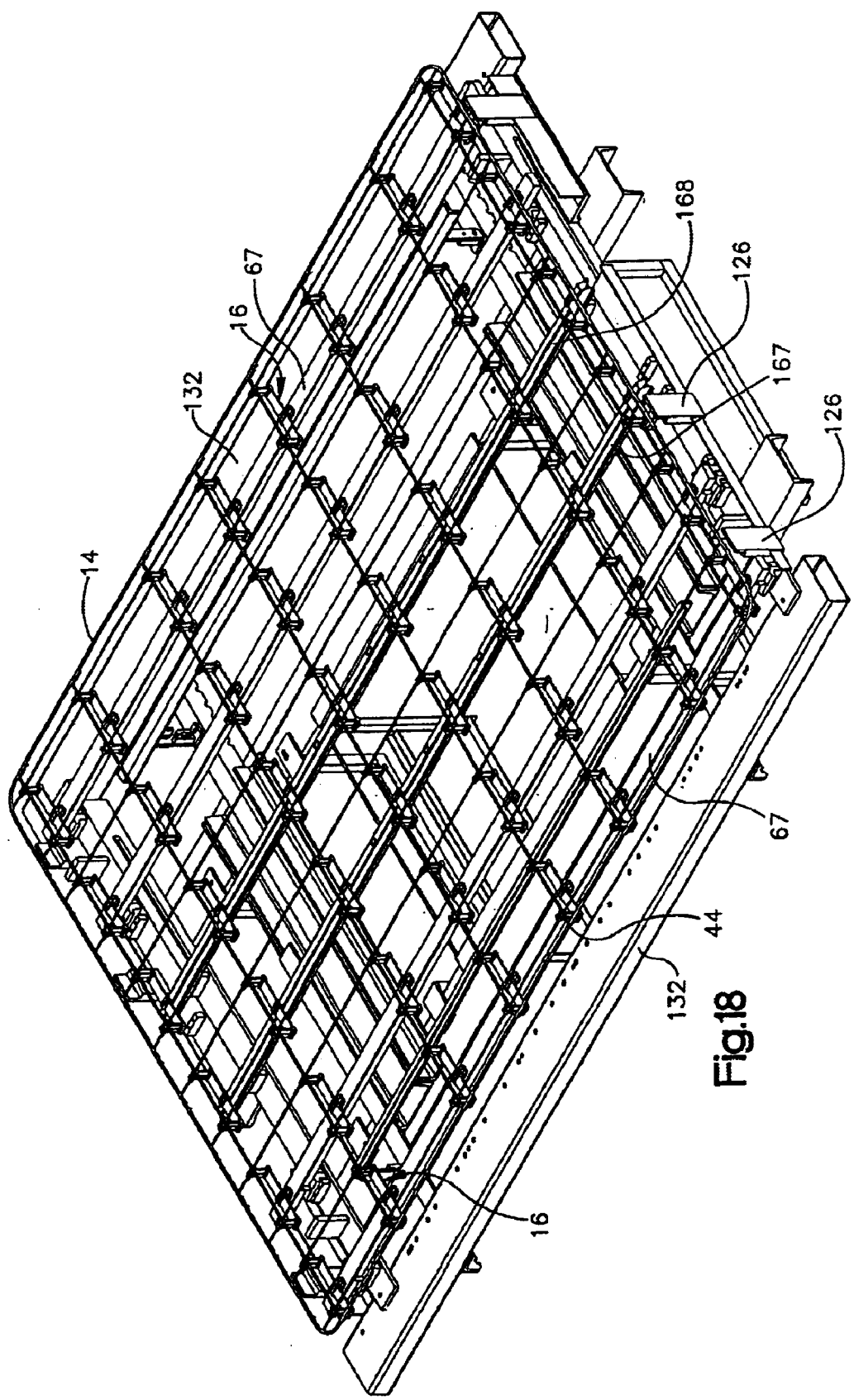
Figure 19:
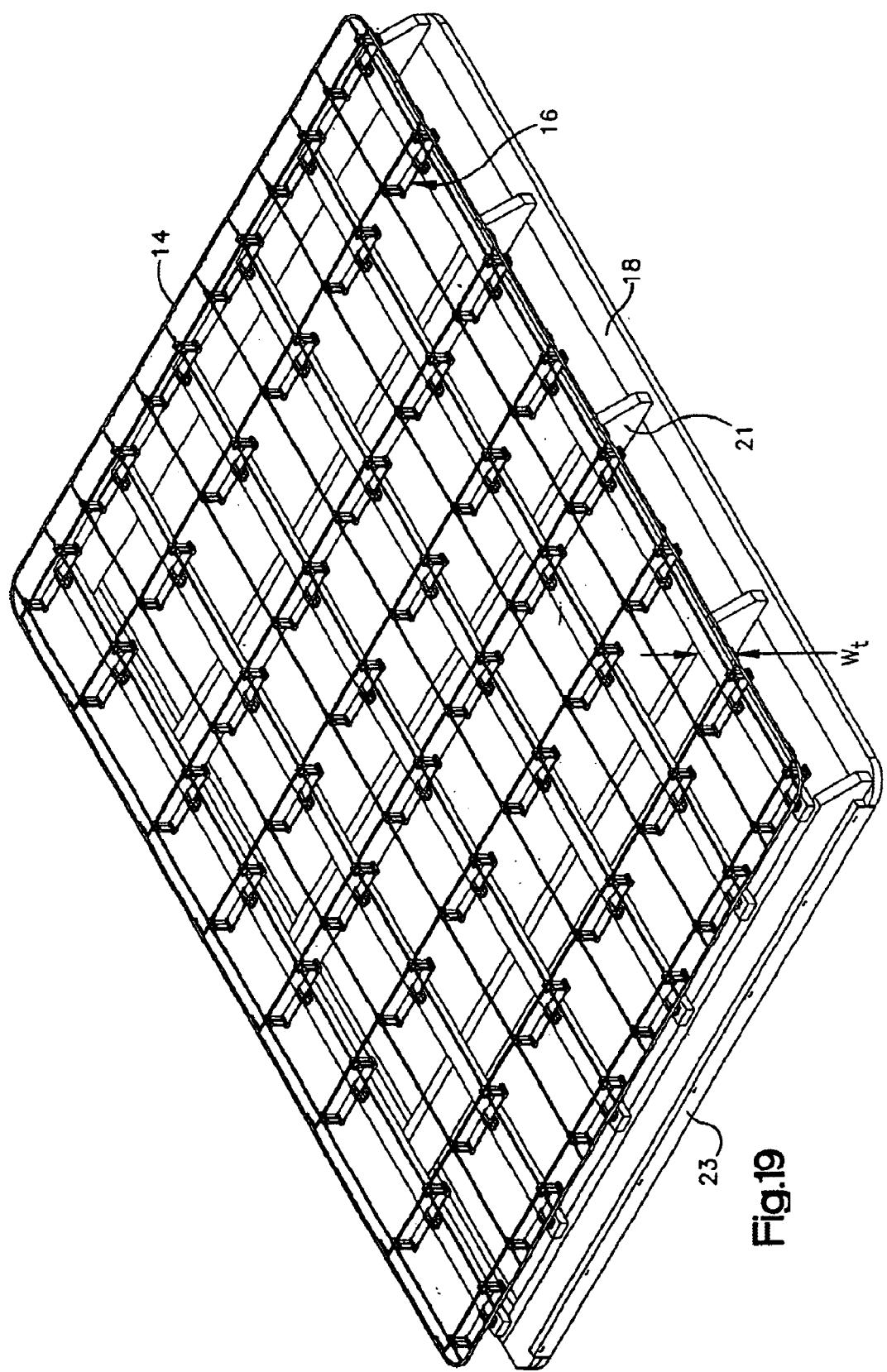
FIG. 19 is a perspective view of a high profile version of a mattress foundation frame and spring structure constructed in accordance with the present invention.

As shown in FIG. 18, the grid attachment jig 120 can be adapted to support different types of frame members, such as steel members 167 shown as the two center members in the frame subassembly. The frame member/grid subassembly which is completed at jig 120, is then removed and attached to the bottom portion of the frame, as shown in FIGS. 7 and 19, which includes longitudinal perimeter members 18, and transverse members 21 which support frame members 67. The major width wt of the transverse members 21 can be oriented parallel to the top planar surfaces of the perimeter members 18, as in FIG. 2, or orthogonal to the top planar surfaces of the perimeter members 18, as in FIG. 19, depending upon the desired height of the spring structure.

In the manufacturing and assembly methods and processes of the invention, the assembly of the composite material mattress foundation system is highly flexible and greatly simplified by the relatively small size and simple geometry of the spring modules. For example, to selectively assemble a composite material mattress foundation of the invention the following steps are performed in any logical order. The spring modules 16 are attached to frame members 67 held in the assembly jig 78. The frame members 67 are then inserted into the grid attachment jig 120, and the grid is secured at the intersections to each of the attachment fittings of the spring modules. The grid/spring/frame member subassembly is then removed from the jig 120 and placed on the foundation frame subassembly of the perimeter and transverse members described with reference to FIGS. 2, 7 and 19. The spring modules 16 are not located at the intersections of the upper longitudinal frame members 22/67 and the transverse members 21 so as not to interfere with frame member interconnection at these points.

The type of spring modules used may be selected by shape and/or color (indicating spring rate) to be of either uniform or dissimilar spring properties. For example, modules of a higher spring rate may be placed in the hip and/or back regions of the foundation and lower spring rates near the ends. Similarly, stiffer spring modules can be located at the perimeter of the foundation to provide greater support of the mattress edge where people sit. The grid 14 is then secured to each of the grid attachment stanchion fittings 36 of the modules 16 by top or side entry engagement of the grid intersections (of elements 26 and 28) with the stanchion gripping fingers 44, as described above. Padding and covering is then attached. Each of the assembly steps lends itself to automation given the small size, light weight and simple geometry of the spring modules, and the elimination of dimensional constraints dictated by awkward multiple bend steel wire springs.

Although the invention has been described in detail with respect to certain preferred and alternate embodiments, it will be appreciated to those of skill in the art that certain modifications and variations of the inventive principles disclosed. In particular, it will be acknowledged that the composite material spring modules with integrally formed attachment fittings can be attached to or utilized with any support structure or frame and elements or members of any overlying structure such as a grid or matrix design to transfer loads to the springs, such as for example, but not limited to frame and structures as found in mattresses, furniture, seating, dampening devices, and any structure or assembly where a reflexive weight or load bearing surface is required.

Also, any form of attachment fittings which are integrally formed with or bonded to the spring body and configured for attachment to a member which supports the spring module, and for attachment to a structure supported by the spring module is well within the scope of the invention. All such variations and modifications are within the scope and purview of the invention as defined for now by the accompanying claims and all equivalents thereof.

What is claimed is:

1. An assembly jig for attaching springs to a frame member for a flexible support structure, the assembly jig comprising:
   a plurality of blocks slidably mounted upon a jig channel, each block having at least one glide pad configured for direct contact with a surface of the jig channel, and wherein at least one glide pad has an alignment key for engaging a lateral slot in the jig channel;
   each block fixable at a predetermined location on the jig channel;
   each block configured to receive a portion of a frame member, and
   each block further having a structure for positioning a spring module into alignment with a received frame member.

2. An assembly jig for attaching springs to a frame member for a flexible support structure, the assembly jig comprising:
   a plurality of blocks mounted upon a jig channel;
   each block fixed at a predetermined location on the jig channel;
   each block configured to receive a portion of a frame member;
   each block further having a structure for positioning a spring module into alignment with a received frame member;
   wherein the blocks further comprise jig blocks configured to accept a frame member and a spring module and position the spring module into alignment with the received frame member, wherein the jig blocks comprise generally opposing walls configured to accept a frame member, and wherein the opposing walls are beveled toward the center of the jig block.

3. An assembly jig for attaching springs to a frame member for a flexible support structure, the assembly jig comprising:
   a plurality of blocks mounted upon a jig channel;
   each block fixed at a predetermined location on the jig channel;
   each block configured to receive a portion of a frame member;
   each block further having a structure for positioning a spring module into alignment with a received frame member;
   wherein the blocks further comprise jig blocks configured to accept a frame member and a spring module and position the spring module into alignment with the received frame member, wherein the jig blocks comprise generally opposing walls configured to accept a frame member, and wherein a distance between the opposing walls at the tops of the opposing walls is greater than a distance between the opposing walls at the bases of the opposing walls.

* * * * *